United States Patent [19]

Nomura et al.

[11] Patent Number: 5,965,038
[45] Date of Patent: Oct. 12, 1999

[54] CONTROL EQUIPMENT FOR RESISTANCE WELDING MACHINE

[75] Inventors: Yoshihito Nomura; Tatsuaki Ambo; Saburou Souma; Chihiro Okado, all of Tokyo, Japan

[73] Assignee: Kabushiki Kaisha Toshiba, Kawasaki, Japan

[21] Appl. No.: 08/925,316

[22] Filed: Sep. 8, 1997

Related U.S. Application Data

[62] Division of application No. 08/452,338, May 26, 1995, Pat. No. 5,844,193.

[30] Foreign Application Priority Data

| May 27, 1994 | [JP] | Japan | 6-115294 |
| Jun. 27, 1994 | [JP] | Japan | 6-143729 |
| Sep. 21, 1994 | [JP] | Japan | 6-226149 |
| Apr. 20, 1995 | [JP] | Japan | 7-095498 |
| May 2, 1995 | [JP] | Japan | 7-108690 |

[51] Int. Cl.$^6$ .................................................. B23K 11/24
[52] U.S. Cl. ........................................................ 219/110
[58] Field of Search .................................. 219/110, 108, 219/109, 114, 117.1, 130.32; 363/21, 41, 89

[56] References Cited

U.S. PATENT DOCUMENTS

| 4,910,375 | 3/1990 | Izume | 219/110 |
| 4,988,942 | 1/1991 | Ekstrand | 363/89 |
| 5,489,757 | 2/1996 | Schuermann et al. | 219/110 |
| 5,570,254 | 10/1996 | Spilger et al. | 219/130.32 |

*Primary Examiner*—Clifford C. Shaw
*Attorney, Agent, or Firm*—Oblon, Spivak, McClelland, Maier & Neustadt, P.C.

[57] ABSTRACT

A control equipment for a resistance welding machine for welding a material by the Joule's heat generated in the material by applying an electric power to the material, including an inverter for converting a DC voltage to an AC voltage by pulse width modulation control, a transformer having a primary winding to which the AC voltage is applied and having a secondary winding which supplies an AC current to the material, and a control unit for generating an AC current reference with a rectangular waveform of a specified frequency, comparing the AC current reference with an output current of the inverter to obtain an error, and for PWM controlling the inverter so that the error becomes zero.

4 Claims, 31 Drawing Sheets

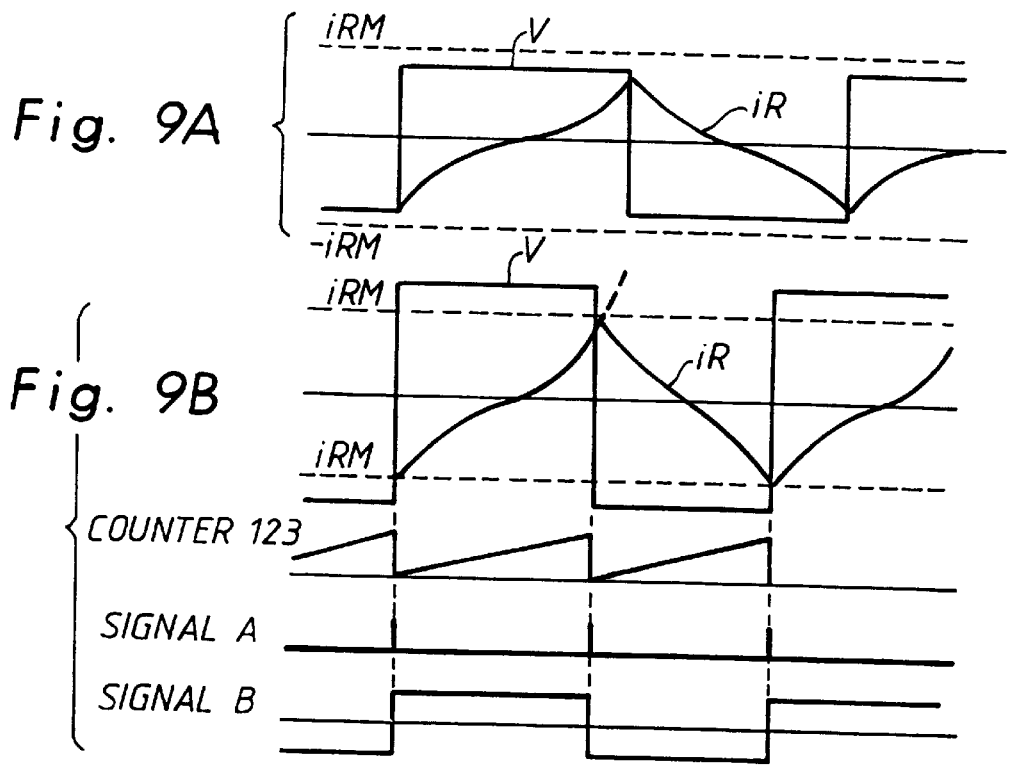
Fig. 9A
Fig. 9B
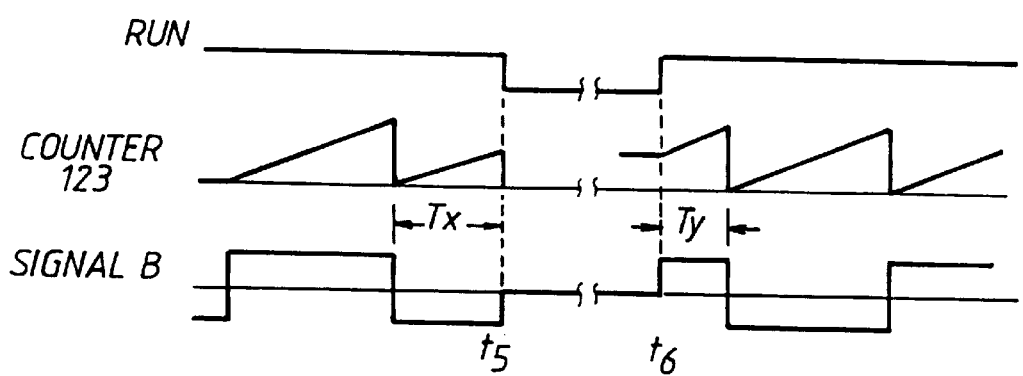
Fig. 10

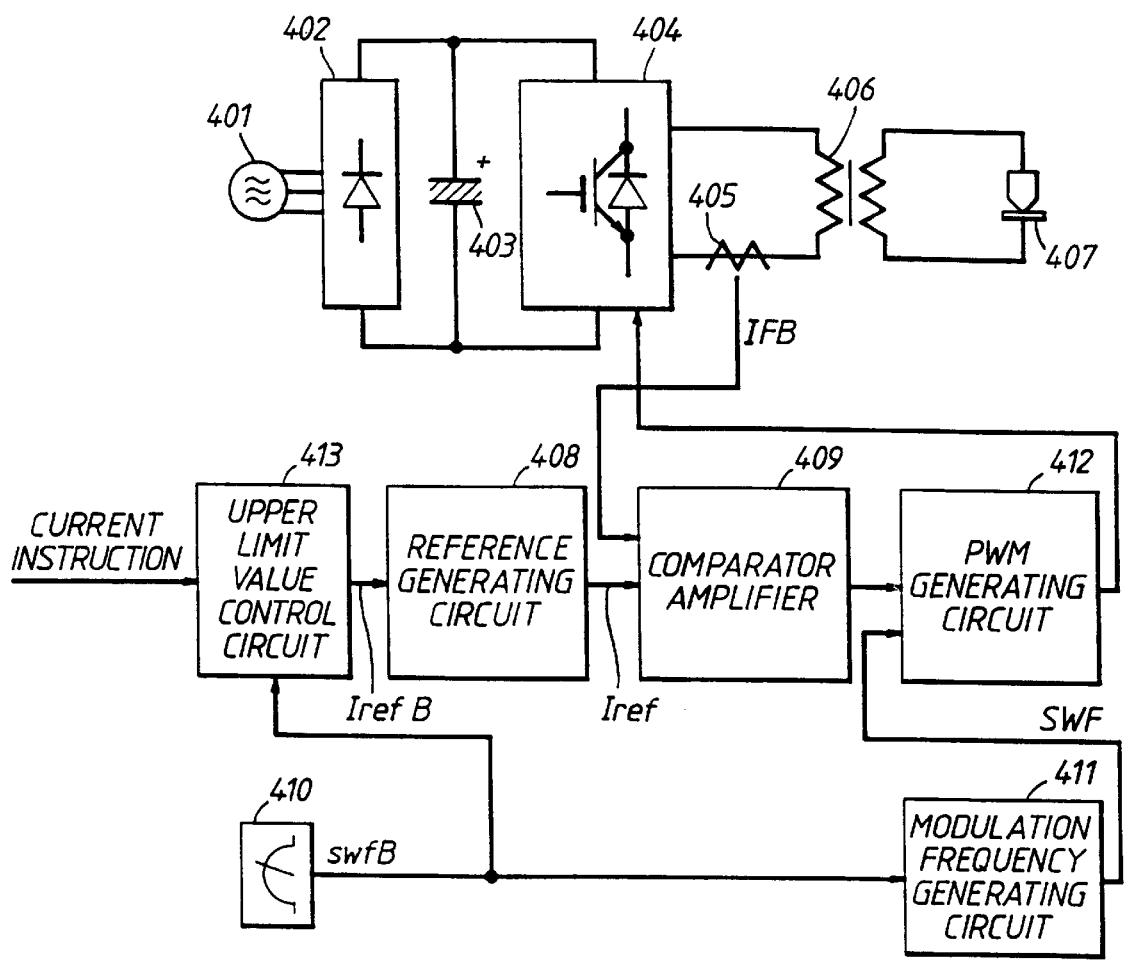
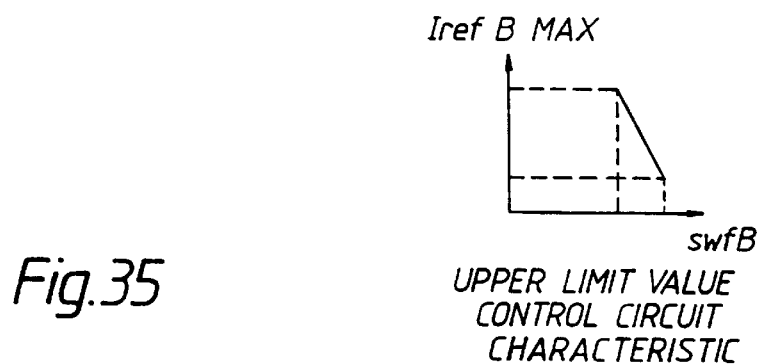
Fig.35
UPPER LIMIT VALUE
CONTROL CIRCUIT
CHARACTERISTIC

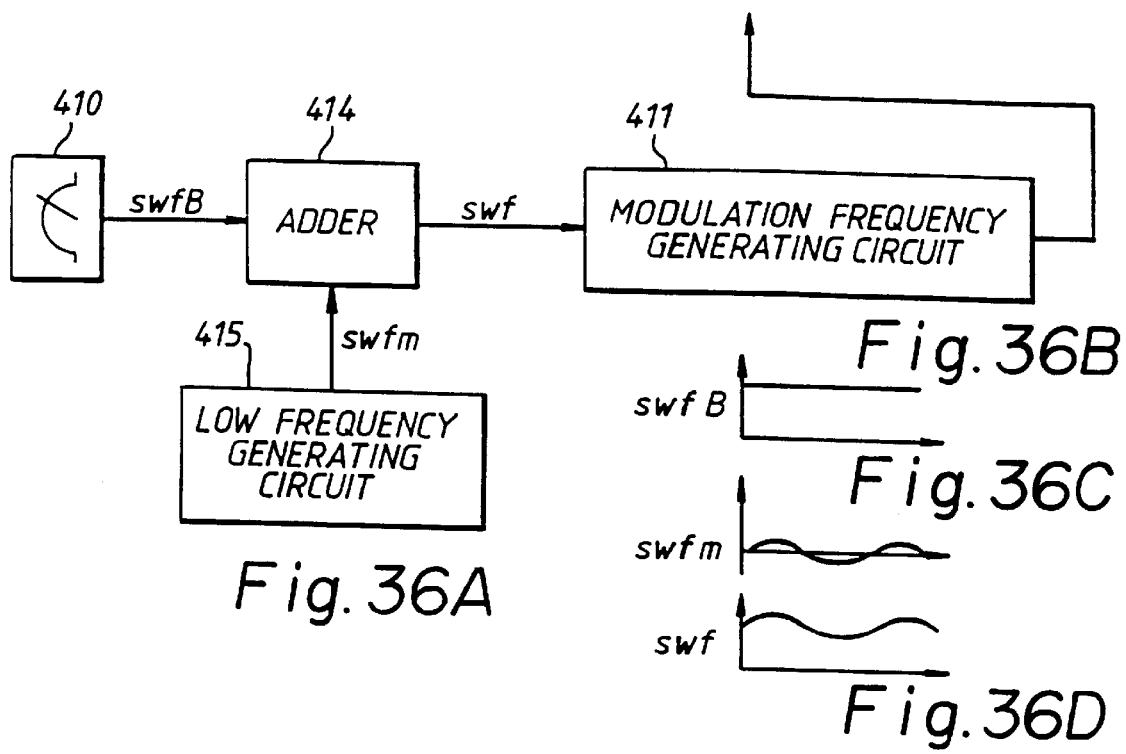
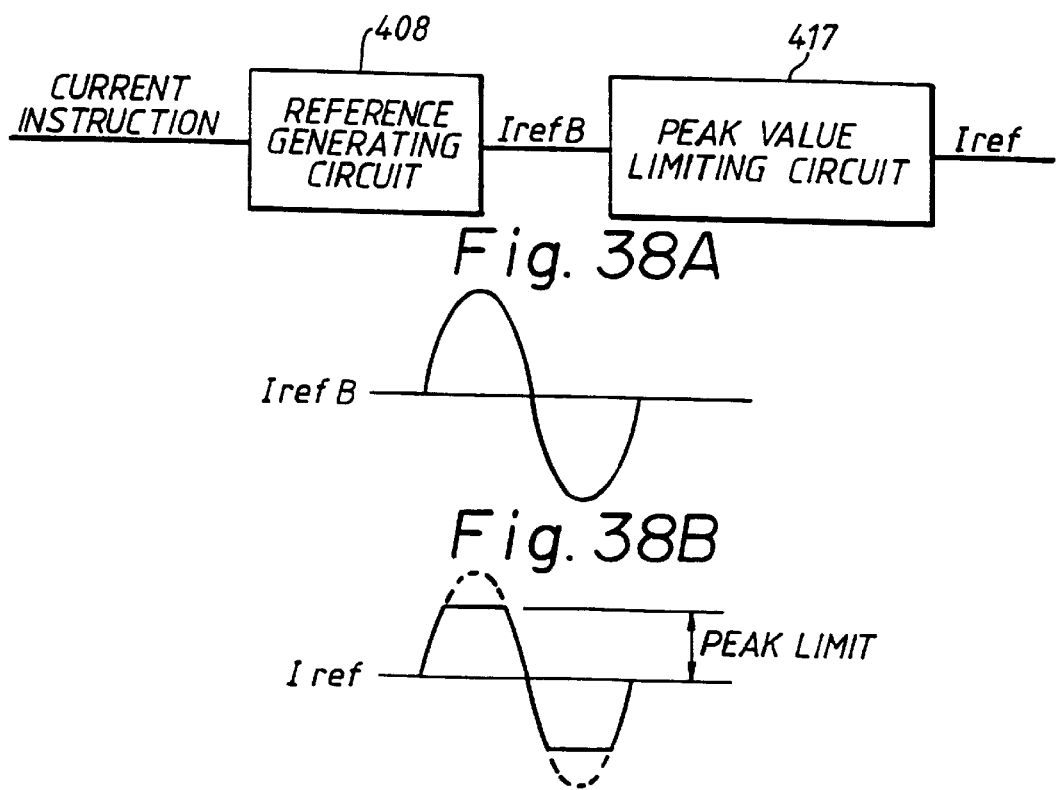

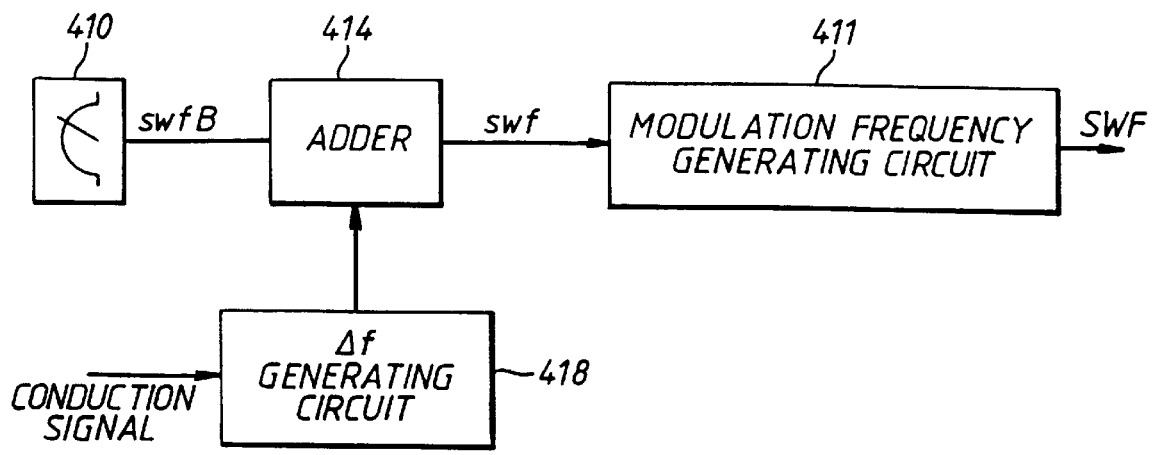
Fig. 39A
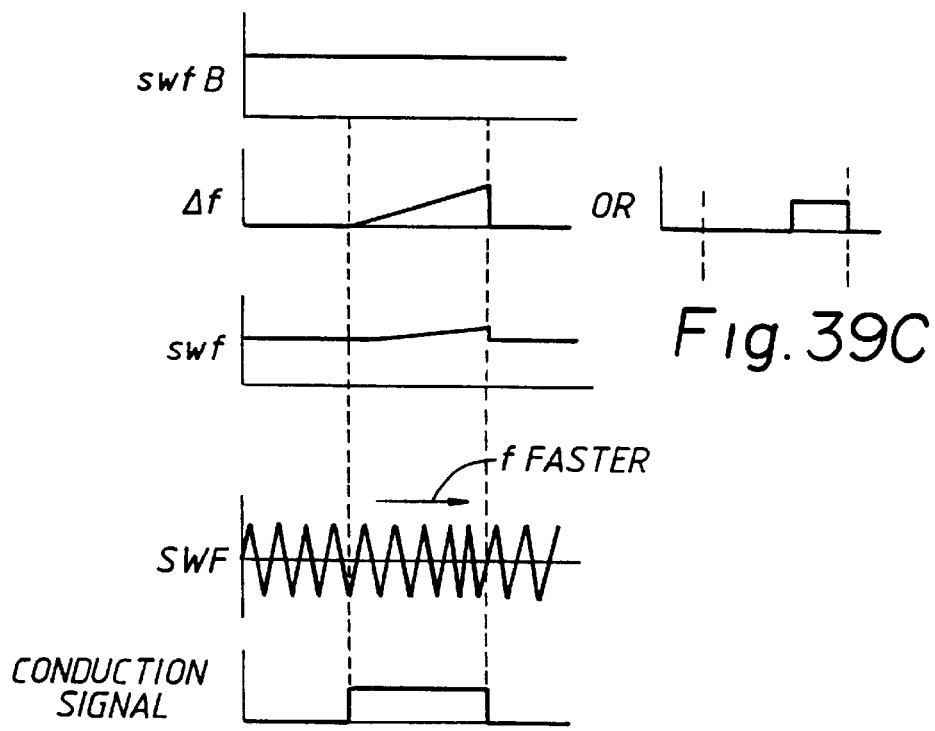
Fig. 39C
Fig. 39B

CONTROL EQUIPMENT FOR RESISTANCE WELDING MACHINE This is a division of application Ser. No. 08/452,338, filed on May 26, 1995, now U.S. Pat. No. 5,844,193.

BACKGROUND OF THE INVENTION

1. Field of the Invention

This invention relates to a control equipment for a resistance welding machine, and more particularly to a control equipment for a resistance welding machine for welding a material by the Joule's heat generated in the material by applying an electric power to the material.

2. Description of the Related Art

As a control equipment for a resistance welding machine, there is an equipment which uses a commercial power source as it stands as the welding current power source. There is also an equipment which uses a commercial power source by first converting it to a DC voltage and then converting the DC voltage to an AC voltage of the desired frequency by using an inverter.

FIG. 41 shows a case of using a commercial power source as it stands. In FIG. 41(a), the voltage of a commercial frequency AC power source 101 is controlled of the trigger phase by thyristors 102 connected in antiparallel. Thus a controlled variable voltage is applied to the primary winding of a transformer 103. A secondary winding of transformer 103 is connected to welding electrodes 105. Resistance welding is performed by passing current to a metal object to be welded which is sandwiched by electrodes 105.

The magnitude of the welding current is set as an effective value by a current setting unit 107. The primary current of transformer 103, detected via a current detector 104 is converted to an effective value by an effective value computing unit 108. Both these currents are compared by a current control unit 109, and a control signal is outputted to reduce their error. The trigger phase is then determined by a phase control unit 110 based on the control signal. When a conduction starting instruction is applied from a starting circuit 112, a conduction instruction is outputted for a specific time period which has been set in timer 113. A driving circuit 111 outputs a trigger pulse at the trigger phase outputted from phase control unit 110 to switch thyristors 102 ON. In this case, as shown in FIG. 41(b), trigger phases α1, α2 of the positive half-wave and the negative half-wave of 1 cycle of the power source voltage are controlled as a pair. Also, due to the leakage inductance of transformer 103 and the floating inductance 106 which is present in the cable between the secondary winding of transformer 103 and welding electrodes 105, the load viewed from the primary side of transformer 103 becomes a delayed power factor. Thus, welding current I flows, as shown by FIG. 41(b).

In this method, the magnitude of the welding current always changes. Thus, there is great fluctuation in the heat at the welding portion and therefore there are limits to the welding quality. Also, since control is performed every one cycle of the commercial frequency, there are limits to the control response. Thus, if welding is performed by the optimum welding current without an enough margin, inferior products will sometimes occur. Also, as the power factor of the load becomes low and the load becomes a single phase load, there is the problem of unbalance occurring in a 3-phase power source load.

The inverter is used in a control equipment as shown in FIG. 42 is used to solve these problems. In FIG. 42(a) a DC voltage is obtained from 3-phase commercial frequency AC power source 101 via a rectifier 114. The DC voltage, which has been smoothed by a capacitor 115, is pulse-width modulated (PWM) by inverter 116 and is converted to AC voltage V1 with a high frequency of 600–1000 Hz, which is applied to the primary winding of transformer 103. The AC voltage which is induced in the secondary winding of transformer 103 is full-wave rectified by diodes 117 and is converted to DC voltage V2. Thus, DC welding current I flows in the object to be welded which is sandwiched by welding electrodes 105.

The design is such that the welding current is determined by current setting unit 107. A primary current of transformer 103 detected via current transformer 104 is converted to a welding current by a simulation circuit 118. These currents are compared by current control unit 109, and a control signal is outputted to make their error zero. This control signal is compared with a high-frequency triangular wave outputted from a carrier generating unit 119 in a PWM control unit 120 and is outputted to driving unit 111 as a PWM control signal. The PWM control signal is outputted from driving unit 111 while the conduction instruction is inputted via starting circuit 112 and timer circuit 13. Thus, inverter 116 outputs the PWM controlled AC voltage V1 shown in FIG. 42(b). A low AC voltage of a waveform similar to this voltage V1 is induced in the secondary winding of transformer 103, and is converted to a full-wave rectified DC voltage V2 by diodes 117 having a large conduction capacity. Thus, a DC welding current I flows as shown in FIG. 42(b).

This method makes high-quality welding possible by solving the problems described above. Moreover, there is advantage of making the transformer small and of light weight by adopting high frequency.

However, in the prior art control equipment for a resistance welding machine as described above in which an inverter is used, the power loss of the diodes provided on the secondary side of the transformer is great. The power loss of the diodes reaches as much as 10–15% of the inverter output, which causes an efficiency reduction of the control equipment, and requires a water cooling system for cooling the diodes. Moreover, since a DC welding current flows, the welding electrodes are electrolyzed and their wear are severe. Therefore, as welding processes become robotized, the down time for replacing the electrodes becomes an increasing problem.

FIG. 43 is a block diagram showing another example of this type of prior art control equipment for a resistance welding machine. An AC power from an AC power source 1 is converted to a DC power by a diode bridge 2 and initially charges a capacitor 6 via a resistor 3. By timing the completion of charging capacitor 6, an electromagnetic contactor 4 is closed via an ON-delay timer 5, and resistor 3 is shorted.

The DC voltage which has been smoothed by capacitor 6, is converted to a high frequency voltage by an inverter bridge 7 and is then voltage-transformed by a transformer 8. The voltage thus transformed is converted to a DC voltage by a diode 9 and a diode 10 and is then supplied to welding electrodes 11.

In this case, a welding current is detected by a current detector 12. The setting of a welding current I is set by a current setter 13. When a starting signal ST is inputted, a conduction signal contact 14 is set ON by a conduction timer 17 and a current reference is inputted to a comparator amplifier 15.

The welding current detected by current detector 12 is inputted to comparator amplifier 15. This current is compared and amplified with the current reference to control the welding current via a PWM circuit 16 by PWM (pulse-width modulation) controlling IGBTs (insulated gate bipolar transistors) which compose inverter bridge 7.

FIG. 44 shows an example of this conduction sequence. When starting signal ST is inputted once, it is held for a 1-cycle period hold and DC current I flows during a set conduction time t1.

A time to the next conduction is longer than time t1, and generally t1/t0 is 0.1–0.05 or less. t1/t0 is generally called the "duty (%)". In the case of a resistance welding machine, time (t0–t1) is the time in which welding point determination (generally by a robot) is executed. In general, time t1 is about 1 second in most cases. Welding is performed during this time t1. For welding, pressure is applied by the electrode tip to the material to be welded, and then the welding current flows through the conducting surface thus formed. The material is heated by a generated Joule's heat Q, that is to say $$Q=I^2 \cdot R \cdot t1$$

and melts, thus forming the weld, where R is a resistance of welding portion.

Welding is performed by the Joule's heat due to a DC welding current flowing between electrodes in this way. However, as the electrodes are fixed due to the DC current, the wear of the negative (−) electrode is severe and requires frequent maintenance. Thus, this requires consumable costs and lost time.

FIG. 45 is a block diagram showing another example of a prior art control equipment for a resistance welding machine.

The AC voltage of an AC power source 201 is converted to a DC voltage by a rectifier 202. After smoothing by a capacitor 203, this DC voltage is converted to an AC voltage with a high frequency of about 1 kHz by an inverter 204 which is composed of IGBT (switching devices) 241–244. After this AC voltage is converted to a low AC voltage by a transformer 205, a DC welding current is supplied to welding electrodes 209 by converting the low AC voltage to a DC voltage by a rectifier 207. Floating inductance 208 is present in the wiring to the welding electrodes 209, and it operates effectively to smooth the DC welding current.

The magnitude of the welding current is controlled by a current reference I*. That is to say, after the primary current of transformer 205 has been detected via a current transformer 206, DC welding current is detected by simulating the DC welding current (the reflux current of rectifier 207 out of the welding current does not flow in the primary side of transformer 205) by a welding current simulator circuit 212. DC welding current I thus detected is compared with current reference I* by a current controller 213 and a current control signal a is outputted by current controller 213 so that its error is reduced. This signal a is compared by a comparator 215 with a triangular wave b outputted from a carrier generator 214, and a PWM signal c is generated based on the comparison result. Carrier generator 214 also outputs a signal d which is synchronized with the cycle of triangular wave b. A distributing circuit 216 activates either of its output signals e of f in response to signal d. By this means, PWM signal c is supplied alternately to driving circuits 212 and 222 via AND circuits 217 and 218.

A timer 220 operates when a drive signal g is inputted from a starting circuit 219, and outputs a conduction signal h only for a set time to driving circuits 221 and 222. Thus, by rendering driving circuits 221 and 222 in the operating state, switching signals j and k are outputted alternately. Thus, the group of IGBT 241, IGBT 244 and the group of IGBT 243, IGBT 242 are switched ON alternately. Therefore a high frequency AC voltage is applied from inverter 204 to the primary side of transformer 205 to control the welding current and the welding time.

With the above prior art control equipment, there is the advantage that the transformer can be miniaturized because the current control response is swift, there is little current ripple and the inverter frequency is high.

However, since a DC welding current is passed, the wear of the welding electrodes due to electrolytic action is severe. Thus, when the welding process is robotized, frequent exchange of electrodes is required. For this reason, the assembly line must be stopped temporarily, and this causes reduction of availability.

Moreover, there are also some problems, such as the occurrence of a 10% to 20% power loss in rectifier 207 which rectifies a current of several tens of thousands of amperes, and the increase of cooling water due the generation of that power loss.

SUMMARY OF THE INVENTION

Accordingly, one object of this invention is to provide a control equipment for a resistance welding machine which can design a long length of life for the welding electrode by preventing polarized wear of the welding electrode.

Another object of this invention is to provide a control equipment for a resistance welding machine which can efficiently perform high quality welding by reducing the electrode wear.

Another object of this invention is to provide a control equipment for a resistance welding machine which can improve the availability by reducing the down time by reducing electrode wear.

Another object of this invention is to provide a control equipment for a resistance welding machine which can perform high quality welding by improving the current control response characteristics, noise resistance characteristics and reducing welding current ripple.

Another object of this invention is to provide a control equipment for a resistance welding machine which can perform high quality welding by compensating the temperature reduction of the welding part when the welding current is inverted.

Another object of this invention is to provide a control equipment for a resistance welding machine which can supply a highly accurate current by compensating the exciting current portion of the transformer.

Another object of this invention is to provide a control equipment for a resistance welding machine which can improve the utilization of the magnetic flux of the transformer and wherein the control equipment can be made small in size.

Another object of this invention is to provide a control equipment for a resistance welding machine which can perform high quality welding by controlling to prevent the transformer from saturation and using the magnetic flux density of the core of the transformer to the maximum.

Still another object of this invention is to provide a control equipment for a resistance welding machine which can reduce audible noises generated due to the modulation frequency and the higher harmonics of the current reference waveform and can improve the working environment of the welding operation.

These and other objects of this invention can be achieved by providing a control equipment for a resistance welding machine for welding a material by the Joule's heat generated in the material by applying an electric power to the material, including an inverter for converting a DC voltage to an AC voltage by pulse width modulation control, a transformer having a primary winding to which the AC voltage is applied and having a secondary winding which supplies an AC current to the material, and a control unit for generating an AC current reference with a rectangular waveform of a specified frequency, comparing the AC current reference with an output current of the inverter to obtain an error, and for PWM controlling the inverter so that the error becomes zero.

According to one aspect of this invention, there can be provided a control equipment for a resistance welding machine for welding a material to be welded by the Joule's heat generated in the material by applying an electric power to the material via welding electrodes, including, an inverter for converting a first DC power to a first AC power, a transformer for transforming the first AG power at a primary winding to a second AC power at a secondary winding, and a control unit for converting the second AC power to a second DC power with two different polarities and for applying the second DC power to the welding electrodes of the resistance welding machine.

According to another aspect of this invention, there can be provided a control equipment for a resistance welding machine for welding a material by the Joule's heat generated in the material by applying an electric power to the material including, an inverter for converting a DC voltage to an AC voltage by pulse width modulation control, a transformer having a primary winding to which the AC voltage is applied and having a secondary winding which supplies an AC current to the material, and a PWM control unit for generating a DC current reference and for PWM controlling the inverter based on a PWM signal composed of an ON PWM signal and an OFF PWM signal, so that an error between an output current of the inverter and the DC current reference becomes zero. The PWM control unit includes a reference control unit for generating a reference control signal based on the DC current reference, a pulse width modulating unit for generating the ON PWM signal at a constant modulation cycle and for generating the OFF PWM signal based on a result of comparing the reference control signal and the output current of the inverter, a square wave generating unit for generating a square wave signal for determining a polarity and frequency of the AC voltage outputted from the inverter, and a driving unit for controlling the inverter in response to the PWM signal and the square wave signal.

According to another aspect of this invention, there can be provided a control equipment for a resistance welding machine for welding a material by the Joule's heat generated in the material by applying an electric power to the material including, a power converter for converting a DC voltage to an AC voltage by pulse width modulation control, the AC voltage being applied to the material to flow a load current, and a PWM control unit for generating a current reference and for PWM controlling the converter based on a PWM signal composed of an ON PWM signal and an OFF PWM signal, so that an error between the current reference and the load current becomes zero. The PWM control unit includes a reference control unit for generating a reference control signal based on the current reference, a pulse width modulating unit for generating the ON PWM signal at a constant modulation cycle and generating the OFF PWM signal based on a result of comparing the reference control signal and the load current, a unit for generating, in synchronized with the modulation cycle, a dither signal which gradually increases or decreases and for adding the dither signal to one of the current reference and the load current, and a correction unit for correcting one of the current reference and the load current by one of a modulation factor obtained from the PWM signal and an output of a function generator to which the modulation factor is applied.

According to still another aspect of this invention, there can be provided a control equipment for a resistance welding machine for welding a material by the Joule's heat generated in the material by applying an electric power to the material including, an inverter for converting a DC voltage to an AC voltage by pulse width modulation control, a transformer having a primary winding to which the AC voltage is applied and having a secondary winding which supplies an AC current to the material, and a PWM control unit for generating a current reference and for PWM controlling the inverter based on a PWM signal so that an error between an output current of the inverter and the current reference becomes zero. The PWM control unit includes a control unit for controlling an output current of the inverter by a PWM signal based on a comparison between a current reference and the output current, a control unit for reversing a direction of the output current of the inverter based on a frequency reference, a comparison unit for alternately comparing a change rate of the output current during a cycle of the final PWM signal of ON state in a positive cycle of the output current with a change rate of the output current during a cycle of the final PWM signal of ON state in a negative cycle of the output current, and an adjustment unit for adjusting at least one of amplitudes and times of the positive and negative cycles of the output current based on a comparison result of the comparison unit.

According to another aspect of this invention, there can be provided a control equipment for a resistance welding machine for welding a material by the Joule's heat generating in the material by applying an electric power to the material including, an inverter for converting a DC voltage to an AC voltage by pulse width modulation control, a transformer having a primary winding to which the AC voltage is applied and having a secondary winding which supplies an AC current to the material, a detection unit for detecting a polarity and a conduction time width at a final half-cycle before ending conduction, a control unit for comparing whether the conduction time width is wider or narrower than a set time value, and starting conduction in a direction of the polarity firstly at the next conduction time when the conduction time is narrower and starting conduction in a direction opposite to the polarity firstly at the next conduction time when the conduction time is wider.

According to still another aspect of this invention, there can be provided a control equipment for a resistance welding machine for welding a material by the Joule's heat generated in the material by applying an electric power to the material including, an inverter for converting a DC voltage to an AC voltage by pulse width modulation control, a transformer having a primary winding to which the AC voltage is applied and having a secondary winding which supplies an AC current to the material, a detection unit for detecting an output current of the inverter and a modulation factor of the pulse width modulation control, and a control unit for comparing a difference between a value of the output current and the modulation factor at the time of final pulse-width modulation control in a positive half-cycle and a difference between a value of the output current and the modulation factor at the time of final pulse-width modulation control in a negative half-cycle, and controlling at least one of amplitudes of the output current in the positive and negative cycles and conduction time widths of the positive and negative cycles of the output current based on a comparison result in a direction that the differences balance.

According to another aspect of this invention, there can be provided a control equipment for a resistance welding machine for welding a material by the Joule's heat generated in the material by applying an electric power to the material including, an inverter for converting a DC voltage to an AC voltage by pulse width modulation control, a transformer having a primary winding to which the AC voltage is applied and having a secondary winding which supplies an AC current to the material, a control unit for generating an AC current reference of a specified frequency, comparing the AC current reference with an output current of the inverter to obtain an error, and for PWM controlling the inverter so that the error becomes zero, and an adjusting unit for adjusting a switching frequency to perform the pulse width modulation control according to a state of a load of the resistance welding machine. The inverter is pulse width modulation controlled based on the switching frequency adjusted by the adjusting unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9a, 9b are drawings to illustrate the operation of the embodiment in FIG. 6;

FIG. 10 is a drawing to illustrate the operation of the embodiment in FIG. 6;

FIG. 35 is a circuit diagram showing a control equipment for a resistance welding machine according to a fourteenth embodiment of this invention;

FIGS. 36a, b, c, and d are circuit diagrams showing the essential parts of a control equipment for a resistance welding machine according to a fifteenth embodiment of this invention;

FIGS. 38a, 38b, and 38c are circuit diagrams showing the essential parts of a control equipment for a resistance welding machine according to an eighteenth embodiment of this invention;

FIGS. 39a, 39b, and 39c are circuit diagrams showing the essential parts of a control equipment for a resistance welding machine according to an nineteenth embodiment of this invention;

DETAILED DESCRIPTION OF THE PREFERRED EMBODIMENTS

Figure 1:
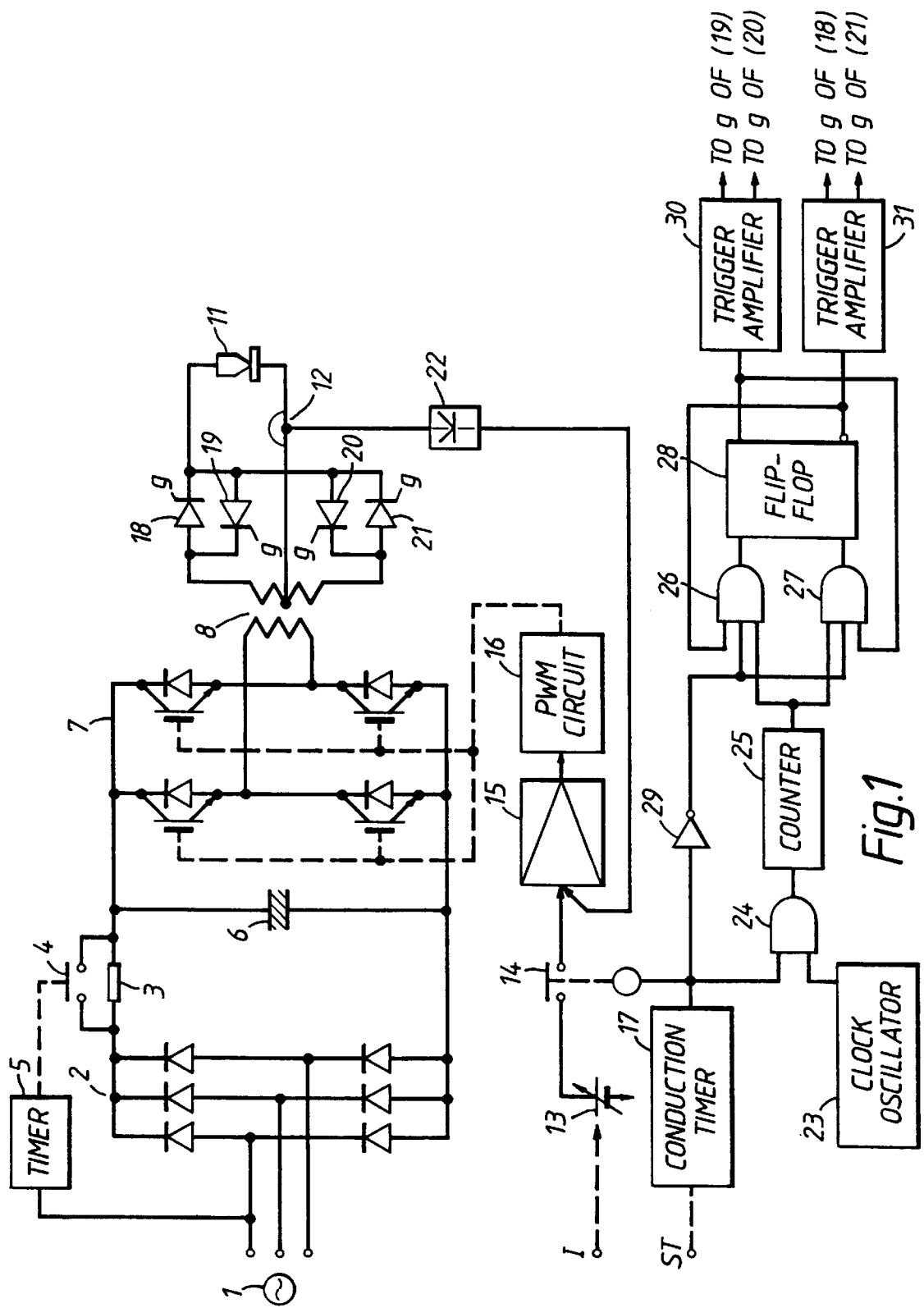
FIG. 1 is a circuit diagram showing a control equipment for a resistance welding machine according to a first embodiment of this invention.

Referring now to the drawings, wherein like reference numerals designate identical or corresponding parts throughout the several views, the embodiments of this invention will be described below.

Figure 43:
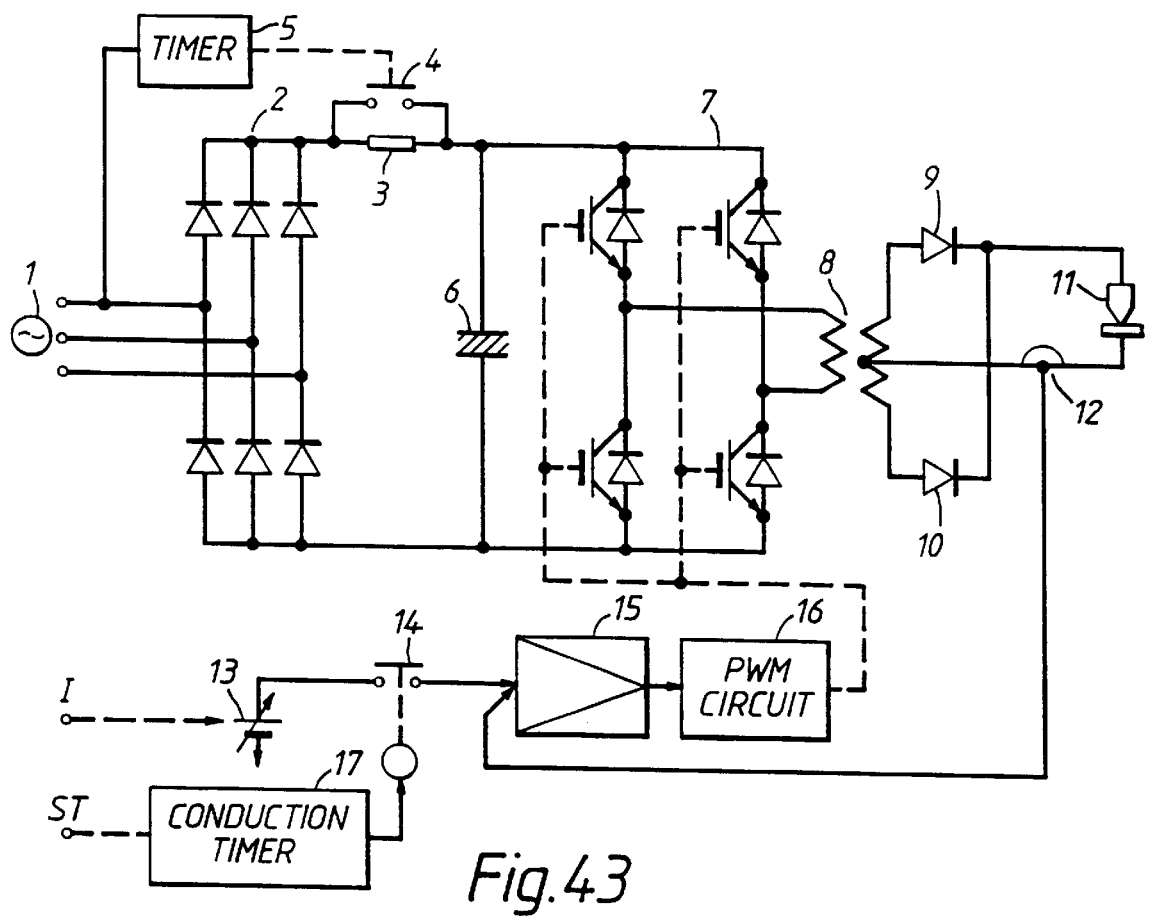
FIG. 43 is a circuit diagram showing another example of a prior art control equipment for a resistance welding machine.
Figure 44:
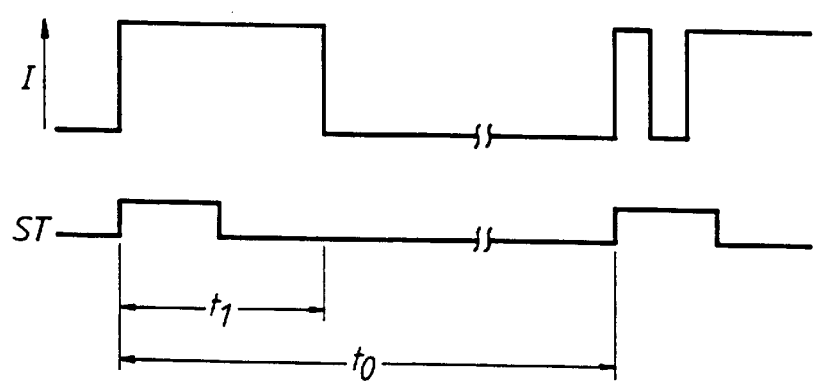
FIG. 44 is a drawing to illustrate the operation of the prior art control equipment in FIG. 43.

FIG. 1 is a circuit diagram showing a first embodiment of this invention. Here, parts which are the same as those in FIG. 43 have been given the same symbols, and their descriptions have been omitted.

The high-frequency output from transformer 8 is polarity-switched by triacs 18–21, and it is then supplied to welding electrodes 11. The output of current detector 12 becomes positive and negative, it is therefore inputted to comparator transformer 15 via an absolute value circuit 22.

The output of conduction timer 17 is applied to an inverter 29. The logical product of the output of conduction timer 17 and the output of a clock oscillator Z3 is taken by an AND circuit 24. The output of AND circuit 24 is counted for time by a counter 25. When this counter value reaches a specified value, an overflow signal is outputted from counter 25. Here, a binary counter is formed by AND circuits 26 and 27, the output of inverter 29 and a flip-flop 28. The output of flip-flop 28 inverts at every overflow output from counter 25 under the condition when conduction is OFF.

The output of flip-flop 28 is amplified by triac trigger amplifiers 30 and 31. The outputs of triac trigger amplifiers 30 and 31 are connected to gate circuits g of triacs 19 and 20 and triacs 18 and 21, respectively. On points other than these, the circuit is the same as the prior art example in FIG. 43.

Figure 2:
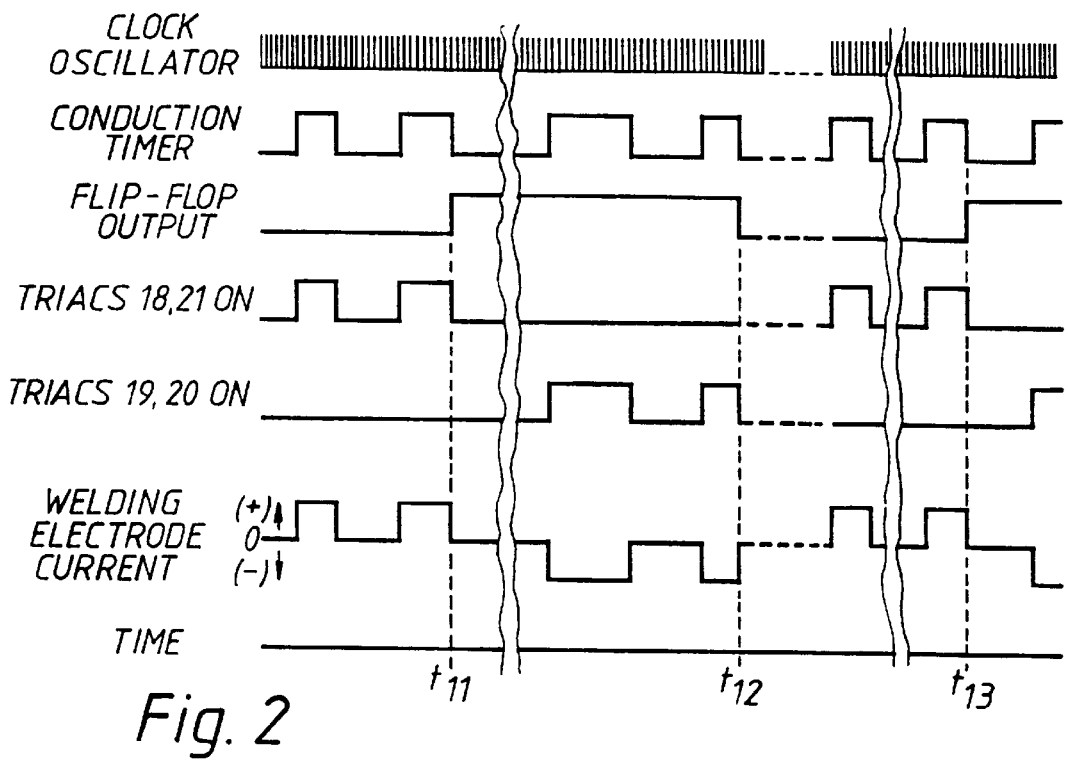
FIG. 2 is a timing chart to illustrate the operation of the embodiment in FIG. 1.

The following is a description of the operation of the first embodiment described above with reference to the timing chart in FIG. 2. The output of conduction timer 17 is logically multiplied with the output of clock oscillator 23 by AND circuit 24 at the same time as the conduction instruction. The output of AND circuit 24 is counted by counter 25. Prior to a time t11 in FIG. 2, the output of flip-flop 28 is in the reset state and the output of triac trigger amplifier 31 is in the logic "1" state. Thus, a signal is applied to gate s g of triacs 18 and 21. Therefore, triacs 18 and 21 are in the potential ON state. Then, when the output of conduction timer 17 becomes ON, that is to say when inverter 7 becomes in the operating state, triacs 18 and 21 become ON. Thus, welding electrodes 11 are charged in the positive polarity direction, and the welding electrode current flows through welding electrodes 11 in the (+) direction of FIG. 2.

Also, this welding conduction time is cumulatively counted by counter 25. When an overflow signal is outputted from counter 25 at a time t11, flip-flop 28 inverts under the conditions of an overflow output from counter 25 and conduction OFF.

By this means, the output of triac trigger amplifier 30 become s logic "1". Thus, a signal from triac trigger amplifier 30 is applied to gate circuits g of triacs 19 and 20, and triacs 19 and 20 become in the potential ON state.

In the same way as mentioned above, when inverter 7 becomes in the operating state triacs 19 and 20 become ON. Thus welding electrodes 11 are charged in the negative polarity direction via triacs 19 and 20, and the welding electrode current flows through welding electrodes 11 in the (−) direction of FIG. 2.

Thereafter, at each specified welding time (t12, t13 . . . ), the polarity of welding current to welding electrodes 11 is reversed, and welding electrodes 11 are charged with the inverted polarity.

When using the first embodiment described above, maintaining its characteristic of smallness and lightness due to high frequency output of inverter 7, the current to welding electrodes 11 is inverted at each unit of from several hours to several tens of hours. By this means, the polarization of wear generated by the negative electrode (−) due to a unidirectional current in welding electrodes 11 can be prevented. Therefore, welding electrodes 11 can be made equal for a positive electrode and a negative electrode.

Naturally, the wear state of welding electrodes 11 changes according to the magnitude of the welding current. Therefore, it is possible to design further evenness of wear by switching by a specified value of the time product of the conduction current by adding a current magnitude weighting to counter 25.

Figure 3:
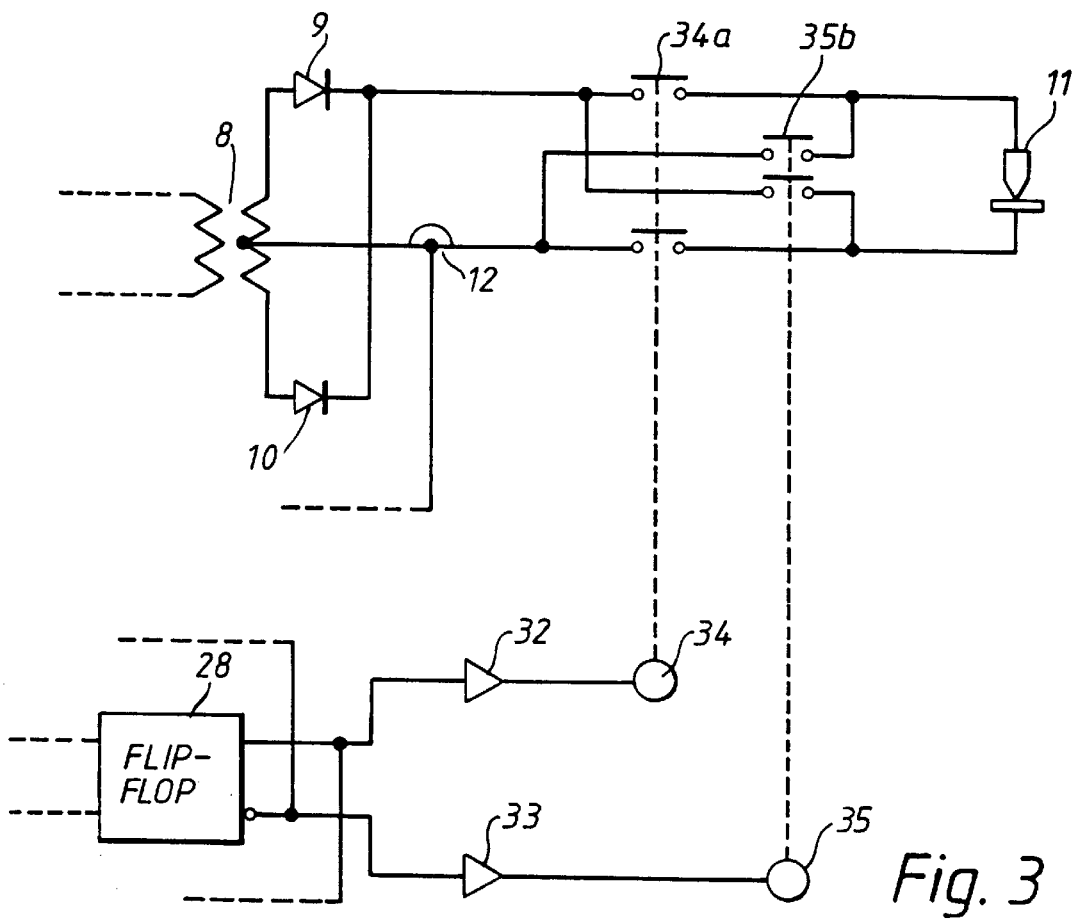
FIG. 3 is a circuit diagram showing the essential parts of a control equipment for a resistance welding machine according to a second embodiment of this invention.

FIG. 3 is a circuit diagram showing a second embodiment of this invention, in which only the parts different from those in the circuit of FIG. 1 are shown. Here, the polarity switching of the embodiment in FIG. 1 is performed by electromagnetic contactors 34 and 35. The outputs of flip-flop 28 are connected to contacts 34a and 35a of electromagnetic contactors 34 and 35 via electromagnetic contactor driving circuits 32 and 33.

In this case, when flip-flop 28 is in the set state, driving circuit 32 operates. Therefore, the driving coil of electromagnetic contactor 34 is energised, and contacts 34a are closed. By this means, the circuit of secondary winding side of transformer 8 is connected so that welding electrodes 11 become in the positive polarity direction.

When flip-flop 28 inverts, driving circuit 33 operates by a similar operation. Therefore, the driving coil of electromagnetic contactor 35 is energized, and contacts 35a are closed. Thus, electromagnetic contactor 35 is connected so that welding electrodes 11 becomes in the negative polarity direction.

By the above operations, instead of polarity switching by the triacs of the first embodiment, in this embodiment polarity switching is brought about by electromagnetic contactors 34 and 35.

Figure 4:
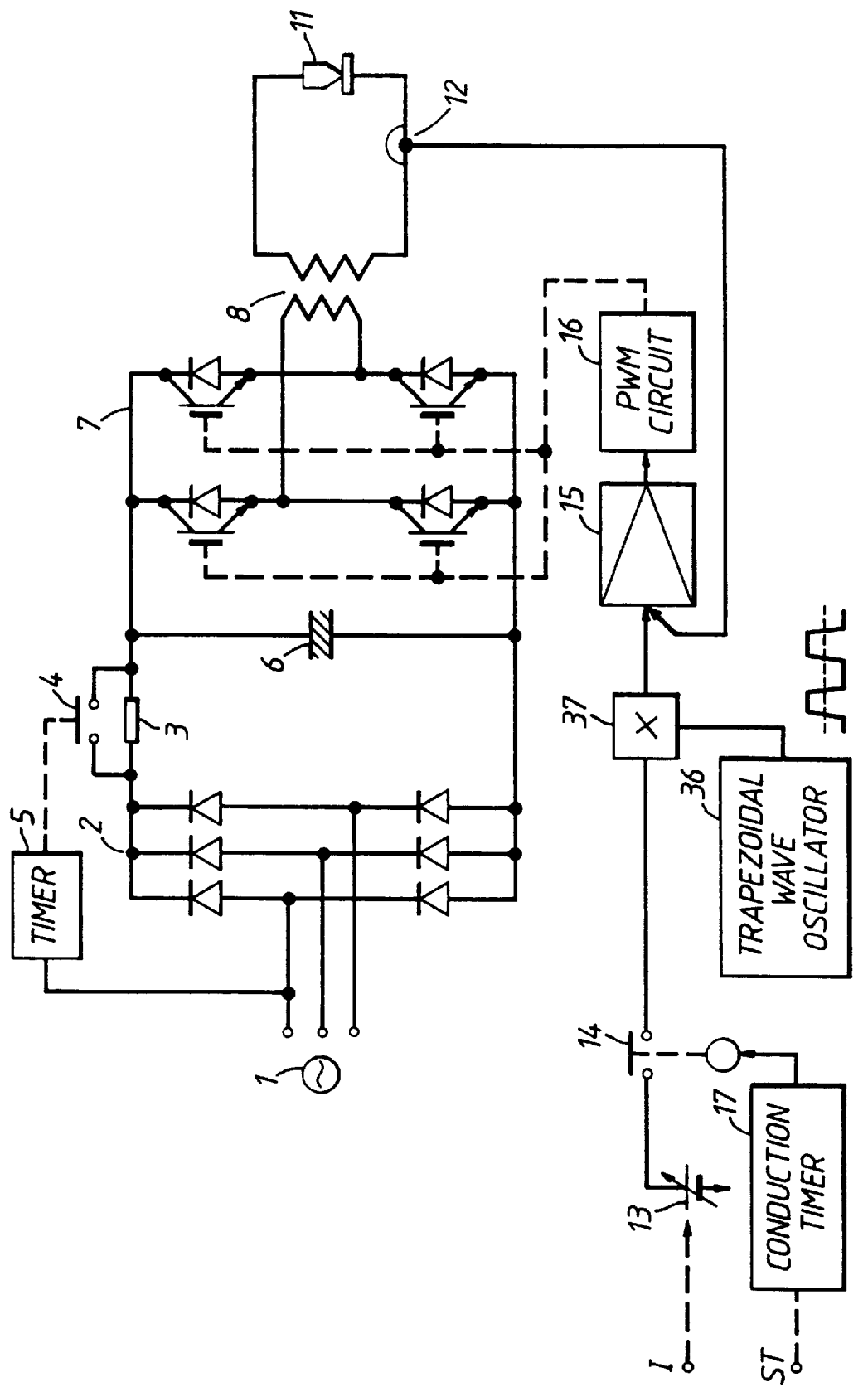
FIG. 4 is a circuit diagram showing a control equipment for a resistance welding machine according to a third embodiment of this invention.

The following is a description of a third embodiment of this invention using FIG. 4. The current reference output of conduction signal contact 14 is multiplied with a 10–200 Hz trapezoidal wave generated by a trapezoidal waveform oscillator 36 by a multiplier 37. This output of multiplier 37 is inputted to PWM circuit 16 via prior art comparator amplifier 15. Thus, PWM circuit 16 generates gate signals for triggering the multiple semiconductor devices of inverter 7 in a specified sequence. The output of inverter 7 is supplied to welding electrodes 11 via transformer 8. In this case, transformer 8 has a leak reactance L0.

The operation of the third embodiment described above is described with reference to FIG. 5. This shows one cycle of conduction timer 17 as an enlarged timing chart. Conduction signal contacts 14 become ON due to an instruction from conduction timer 17, and current reference I is outputted. Trapezoidal waveform oscillator 36 generates a trapezoidal wave with a relatively low frequency of 10–200 Hz. Current reference I is multiplied with the trapezoidal waveform signal by multiplier 37, to produce a trapezoidal wave current reference with its peak value of current reference I1. This signal becomes the current reference for inverter 7. The output current of transformer 8 becomes a current with few ripples due to leak reactance L0. This becomes the current feedback value. Thus, since a current closed loop is formed, the output current of transformer 8 becomes a trapezoidal waveform current with its peak value of the current reference value.

This third embodiment carries out thermal welding due to the generation of Joule's heat in the same way as in the first embodiment. However, 10–200 Hz trapezoidal wave positive/negative current flows in welding electrodes 11. Thus, since equal positive/negative currents flow through welding electrodes 11, the wear of welding electrode 11 becomes even without any polarization in the positive side and negative side.

Figure 5:
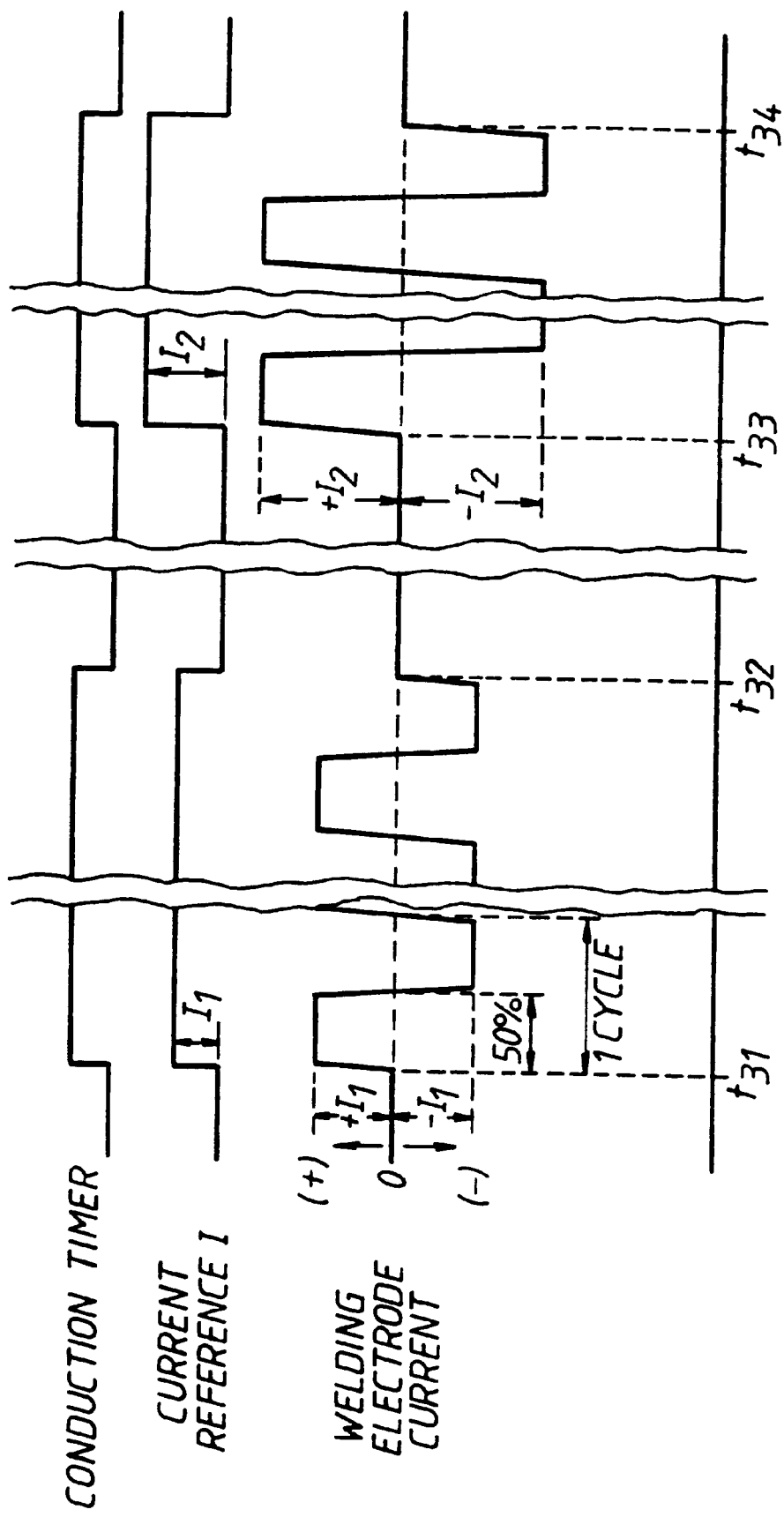
FIG. 5 is a timing chart to illustrate the operation of the embodiment in FIG. 4.

Contrary to the requirement for positive/negative matching of the product of current and time in the first and second embodiments, in the third embodiment, this becomes simple since the trapezoidal current instruction makes the positive/negative peak values equal. FIG. 5 shows an example for current setter 13 in which, out of times t31–t34, the welding current instruction increases from I1 to I2 during time t33–t34.

When using the third embodiment of this invention a control equipment for a resistance welding machine can be provided which can prevent polarized wear of the welding electrode and can significantly lengthen the life of the welding electrode.

Figure 6:
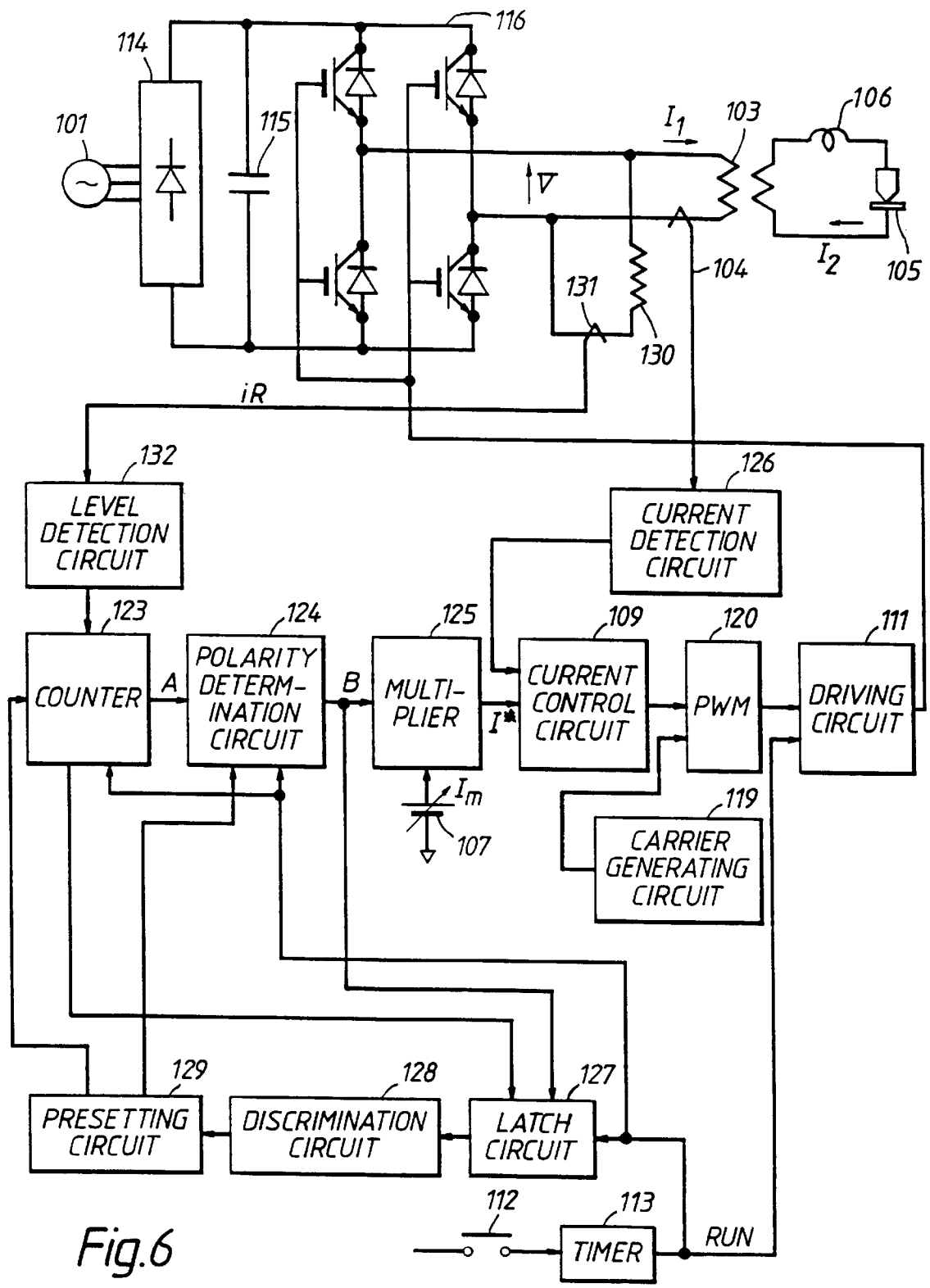
FIG. 6 is a circuit diagram showing a control equipment for a resistance welding machine according to a fourth embodiment to this invention.

FIG. 6 shows a circuit diagram of a fourth embodiment of this invention. Main parts of this embodiment is similar to the third embodiment shown in FIG. 4. In FIG. 6, 123 is a counter housing a clock generating circuit which generates a clock pulse with a specified cycle. While a conduction instruction RUN from timer 113 is active, every time counter 123 counts a preset number of clock pulses, counter 123 overflows and outputs a pulse signal A. 124 is a polarity determination circuit which, while conduction instruction RUN is active, outputs a signal B having a rectangular waveform of a constant amplitude which inverts its polarity every time pulse signal A is inputted. 125 is a multiplier which multiplies signal B and a current value Im set by current setter 107 and outputs and AC current reference I* with a rectangular waveform. 126 is a current detection circuit which detects an instantaneous value of the inverter output current from the detection output of current transformer 104. 127 is a latch circuit which maintains the count value of counter 123 and the positive/negative polarity of output signal B of polarity determination circuit 124 at the final point of conduction instruction RUN. 128 is a discrimination circuit which discriminates whether or not maintained count value exceeds a specified count value and, at the same time, judges the polarity of the residual flux from the maintained positive/negative polarity of signal B. 129 is a presetting circuit which presets counter 123 to a specified value in response to this discrimination result and, at the same time, when the next conduction instruction RUN is inputted to polarity determination circuit 124, presets the polarity of the signal B which will be initially outputted in response to this discrimination result. 130 is a small capacity reactor which simulates an exciting current of transformer 103. 131 is a current detector. 132 is a level detection circuit which, when the detection output iR of current detector 131 exceeds a specified value, outputs a pulse signal for causing counter 123 to overflow and reset counter 123. The rest is the same as in prior art shown in FIG. 42 and is therefore shown by the same symbols.

Figure 7:
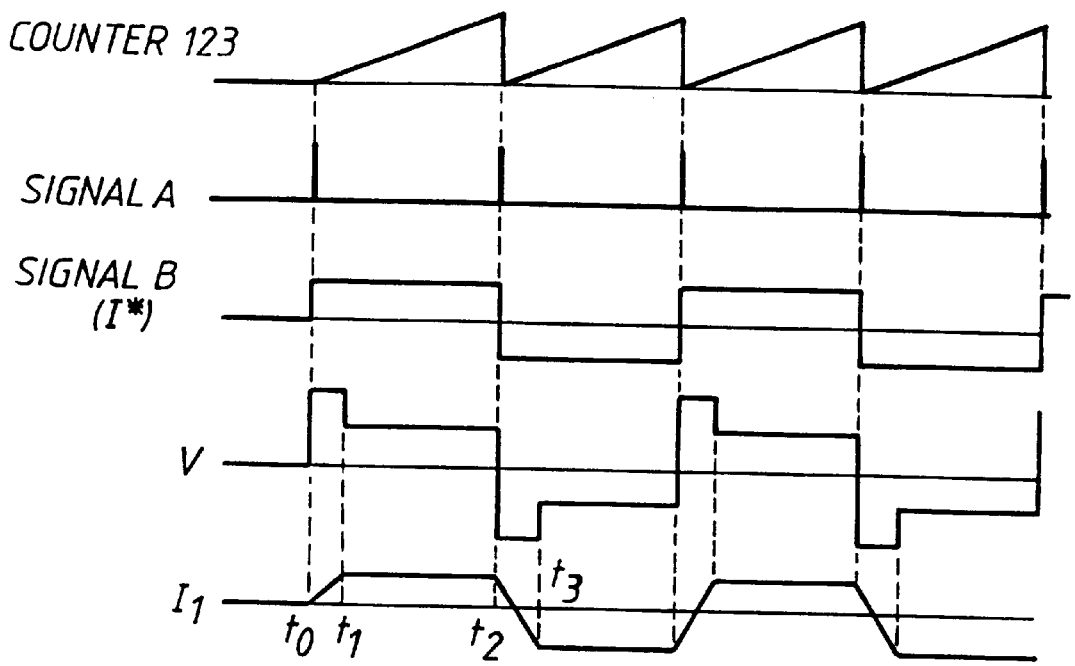
FIG. 7 is a drawing to illustrate the operation of the embodiment in FIG. 6.

In the above composition, when conduction instruction RUN becomes active via starting circuit 112 and timer 113, as shown in FIG. 7, counter 123 starts the counting of the specified cycle clock pulses. When the count value reaches the specified value, counter 123 overflows and zero clears and, at the same time, it outputs pulse signal A. Counter 123 then repeats the operation of starting to count from 0. While conduction instruction RUN is active, polarity determination circuit 124 outputs rectangular wave signal B with a constant amplitude which changes between positive and negative every time pulse signal A is inputted. Signal B is multiplied by multiplier 125 with current value Im set by current setter 107, and is converted to a rectangular waveform current reference I* of amplitude of Im which changes between positive and negative. Therefore, current reference I* has the same waveform as signal B and the amplitude of Im. Current reference I* is inputted to current control unit 109, and is compared with inverter output current I1 detected by current transformer 104 and current detection circuit 126. Current control unit 109 outputs the control signal so that I1 is the same as I*. The control signal is applied to PWM control unit 120. Inverter 116 is PWM controlled via PWM control unit 120 and driving unit 111. By this means, PWM controlled AC voltage V is applied to the primary winding of transformer 103. Thus, AC welding current I2 which corresponds to set current Im is supplied from the secondary winding of transformer 103 to welding electrodes 105.

In this case, a large counter electromotive force is generated when starting, or in the transient period which accompanies the current changing in which the polarity of the current is inverted, due to the leakage inductance of transformer 103 and the floating inductance which is present in the cable between the secondary winding and welding electrodes 105. This transient state is shown during a time t0–t1 or during a time t2–t3 of FIG. 7. During this transient period, a large error occurs between inverter output current I1 and current reference I* due to a delay in current control. Current control unit 109 outputs the maximum control signal in the direction which will reduce the error. Inverter 116 outputs the maximum AC voltage in response to this maximum control signal. Therefore, during the transient period which accompanies a current change, a forcing voltage is applied to the primary winding of transformer 103 as shown in FIG. 7. By letting this forcing voltage to be a large value, the rate of change of current is made larger, thereby the transient period in which the current changes can be shortened. When inverter output current I1 becomes equal to current reference I* and stabilizes at a uniform value, it stabilizes at a voltage which is determined by the load (welding) resistance and the welding current. Thus, a flat current I1 of the constant peak value flows. When the exciting current of transformer 103 is compared with the welding current, this can be ignored. Thus, inverter output current I1 can be regarded as welding current I2.

When the metal provided with the object to be welded which is sandwiched by welding electrodes 105 is a ferromagnetic material, such as an iron plate, leakage inductance 106 of the cable is influenced by this and the value of leakage inductance 106 becomes larger. When leakage inductance 106 becomes larger, the rate of change of current I2, dI2/dt, decreases, the transient period lengthens, and the welding quality sometimes becomes worse. Therefore, these conditions must be taken into account to determine the maximum output voltage of inverter 116. Generally, the flux density of transformer 103 depends on the integrated value of the AC voltage applied to the primary winding. So, if the capacity of transformer 103 is designed to the maximum output voltage of inverter 116, transformer 103 will become a transformer with an unnecessarily large capacity. As shown by B1 in the B-H curves of FIG. 8, a transformer is generally designed to have 60–80% of maximum flux density B2 as a design flux density, thus the transformer becomes large sized. Therefore, in this embodiment, the capacity of transformer 103 is made the normally required capacity in which the forcing voltage is taken into account under the above-described conditions. When the leakage inductance is increased by exceeding this condition, a function is provided which exercises control so that the flux density in transformer 103 does not exceed maximum flux density B2 of FIG. 8.

That is to say, the primary voltage of transformer 103 is applied to reactor 130 which uses an iron core of the B-H curve almost equivalent the the B-H curve of transformer 103. Reactor 130 functions as a small capacity reactor which simulates the flux density of transformer 103. A current iR flowing in reactor 130 has a waveform which simulates the exciting current of transformer 103. Generally, an intensity H of the magnetic field is proportional to the exciting current. Thus, if the B-H curve of the iron core of reactor 130 is the same as the B-H curve of transformer 103, the flux density of reactor 130 is equal to the flux density of transformer 103. Therefore, the flux density of transformer 103 can be monitored by monitoring current iR flowing in reactor 130. When the magnitude of current iR exceeds a specified value iRM a pulse signal is outputted from level detector 132 to make counter 123 overflow and zero clear. Thus, the polarity of output signal B of polarity determination circuit 124 is caused to invert by pulse signal A from counter 123. By this means, the polarity of current reference I* inverts and the polarity of inverter output voltage V also inverts. Thus, it is possible to control the flux density of transformer 103 to a specified value or less.

FIG. 9(a) shows the case when inverter output voltage V is low, and (b) shows the case when it is high. In order to simplify the illustration, the forcing voltage portion has been omitted in FIG. 9.

In FIG. 9(a), when inverter output voltage V is low, current iR flowing in reactor 130 varies in less than the detection level (±iRM) of level detector 132. Therefore level detector 132 does not operate and pulse signal A outputted from counter 123 operates at a determined constant frequency. However, as shown in (b), when inverter output voltage V becomes higher and current iR flowing in reactor 130 exceeds the detection level (±iRM), level detector 132 operates and a pulse signal is outputted. By this pulse signal from level detector 132 counter 123 is caused to overflow before reaching the set count value. Therefore, pulse signal A is outputted from counter 123 and, at the same time, counter 123 is zero cleared. By this means, the polarity of output signal B of polarity determination circuit 124 is inverted and the polarity of inverter output voltage V is also inverted. Thus current iR flowing in reactor 130 is limited within detection level (±iRM). As a result, the output frequency of inverter 116 is corrected in the slightly higher direction, and the flux density of transformer 103 is controlled within the specified value.

Figure 8:
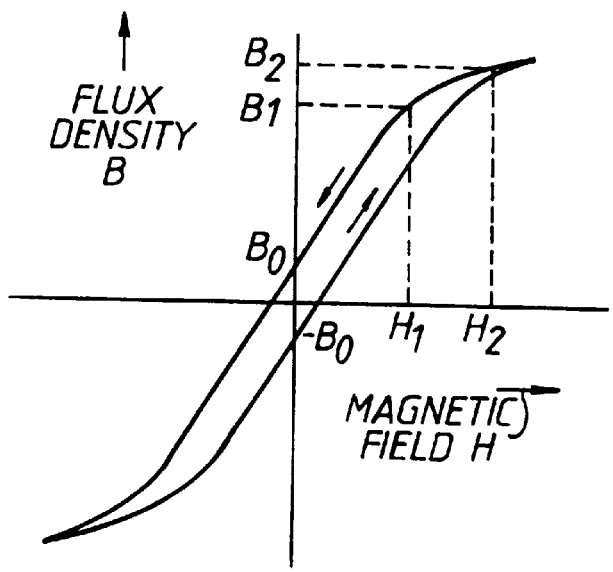
FIG. 8 is a B-H curve of the iron core of transformer 103 in FIG. 6.

Also, as shown by the B-H curve in FIG. 8, the polarity of the residual flux density (±B0) of the iron core of transformer 103 is determined by the polarity (direction) of the magnetic field applied last. Whether or not the changing of the flux density of the iron core is effectively used is thus determined by the polarity of voltage V initially outputted from inverter 116. In this embodiment, a function is provided which determines the polarity of voltage V initially outputted from inverter 116 in response to the polarity of the residual flux. Thus, the flux variation of the iron core of transformer 103 is always used effectively.

That is to say, latch circuit 127 maintains the count value of counter 123 and the polarity of output signal B of polarity determination circuit 124 at the final point of conduction instruction RUN. Discrimination circuit 128 discriminates the polarity of inverter output voltage V from the maintained polarity of signal B at the final conduction time. At the same time, discrimination circuit 128 checks the time during which conduction takes place in the polarity at the final conduction time from the maintained count value, and judges the polarity of the residual flux by judging whether or not such conduction has exceeded a half cycle. Presetting circuit 129 presets the polarity of signal B initially outputted from polarity determination circuit 124 when the next conduction instruction RUN has become active in response to the above discrimination result. At the same time, presetting circuit 129 presets counter 123 to ½ of the count value when it overflows in response to the above discrimination result. FIG. 10 is an example showing the case when a conduction cycle Tx immediately before conduction final point t5 is more than a half-cycle. In this case, the initially outputted signal B is outputted with the polarity thereof being inverted at a time t6 at which the next conduction instruction RUN becomes active. After time t6, in an initial cycle Ty, counter 123 overflows at ½ of a normal cycle, and the polarity of signal B inverts. By this means, it is possible to output voltage V from inverter 116 in response to conduction instruction RUN, so that the flux variation of the iron core of transformer 103 can be effective used.

When using this embodiment, it is possible to supply a welding current of a rectangular waveform with a short transient period in which the polarity of the current inverts. Therefore, it is possible to perform good quality resistance welding. Furthermore, as a welding current is of AC current type, it is possible to reduce electrolysis of the welding electrode thereby to reduce the wear of welding electrode. Also, it is possible to use flux changing effectively as far as the maximum flux density since it is controlled so that the flux density of the transformer will not exceed a specified value. Thus, it is possible to make the transformer small and of light weight.

Figure 11:
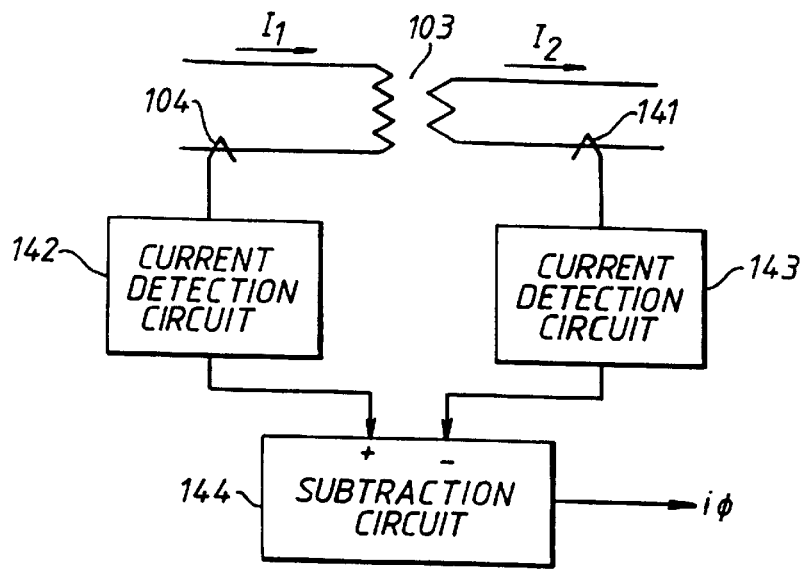
FIG. 11 is a circuit diagram showing the essential parts of a control equipment for a resistance welding machine according to a fifth embodiment of this invention.

FIG. 11 shows the composition of the essential parts of a fifth embodiment of this invention. In this embodiment, a current detector 141 which detects the secondary current of transformer 103 is provided. The primary current and secondary current of transformer 103 are detected via current detection circuits 142 and 143. It is designed to detect an exciting current iΦ by subtracting the secondary current converted to a primary current side from the primary current by a subtraction circuit 144. It can obtain the same operation and effect as those of the previous embodiment by inputting this exciting current iΦ to level detector 132 of FIG. 6 instead of current iR.

Also, a flux density simulation device is provided which performs voltage integration, taking account of the B-H curve of the iron core of transformer 103, from the voltage applied to the primary winding to simulate the flux density of transformer 103. A level detection device is composed such that when the simulated flux density exceeds a specified value it outputs a pulse signal to be applied to counter 123. In this case, it can also obtain the same operation and effect as those of the previous embodiments.

Figure 12:
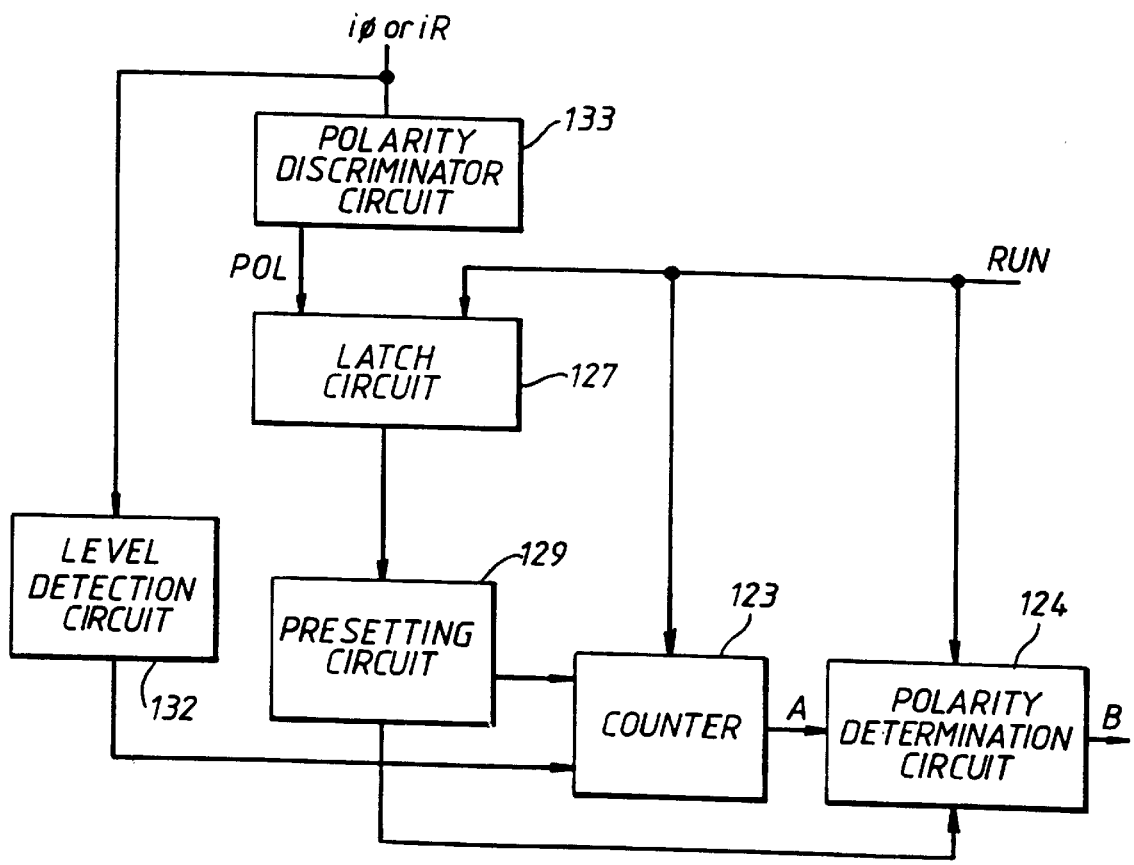
FIG. 12 is a circuit diagram showing the essential parts of a control equipment for a resistance welding machine according to a sixth embodiment of this invention.
Figure 13:
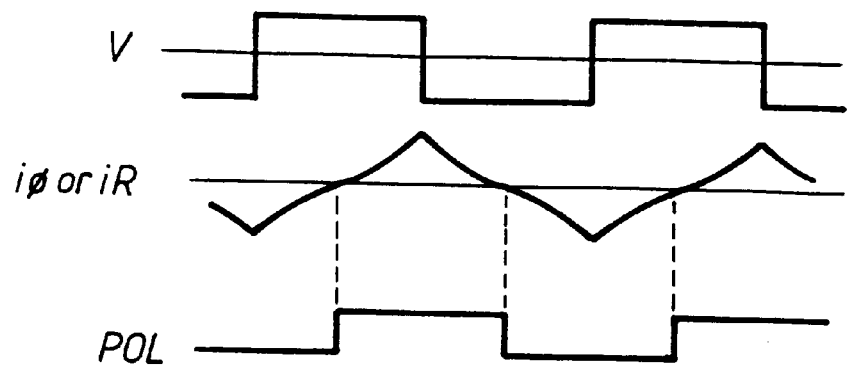
FIG. 13 is a drawing to illustrate the operation of the embodiment in FIG. 12.

FIG. 12 shows the composition of the essential parts of a sixth embodiment of this invention. In FIG. 12, 133 is a polarity discriminator which outputs a logic signal POL corresponding to the polarity of exciting current iΦ of transformer 103 or current iR which flows in reactor 130. Latch circuit 127 maintains logic signal POL at the completion point of conduction instruction RUN. Presetting circuit 129 presets the polarity of the initially outputted signal B at the next conduction instruction RUN in response to the logic value of signal POL which has been maintained. FIG. 13 shows an example of each signal waveform of this embodiment when inverter output voltage V is outputted in rectangular wave form. Since the exciting current and the flux are approximately the same phase, it is designed to discriminate the polarity of the residual flux by signal POL, that is the polarity of the exciting current, at the conduction final point. The same operation and effect as in the previous embodiment can be obtained even when using this embodiment.

When using these fourth to sixth embodiments of this invention, since an AC welding current is used, wear due to electrolysis of the welding electrode is reduced. Thus, the available time to electrode exchange can be extended and the availability factor can be improved. Furthermore, the transient period of current changing can be shortened by making the peak values of the AC welding current constant. Since rectification of the welding current is not performed by diodes, there is no diode power loss, and good quality welding can be efficiently performed. Moreover, since it is possible to use the flux density of the transformer to its maximum, it is possible to make the transformer small and light weight. Thus, a highly economic control equipment for a resistance welding machine can be provided.

Figure 14:
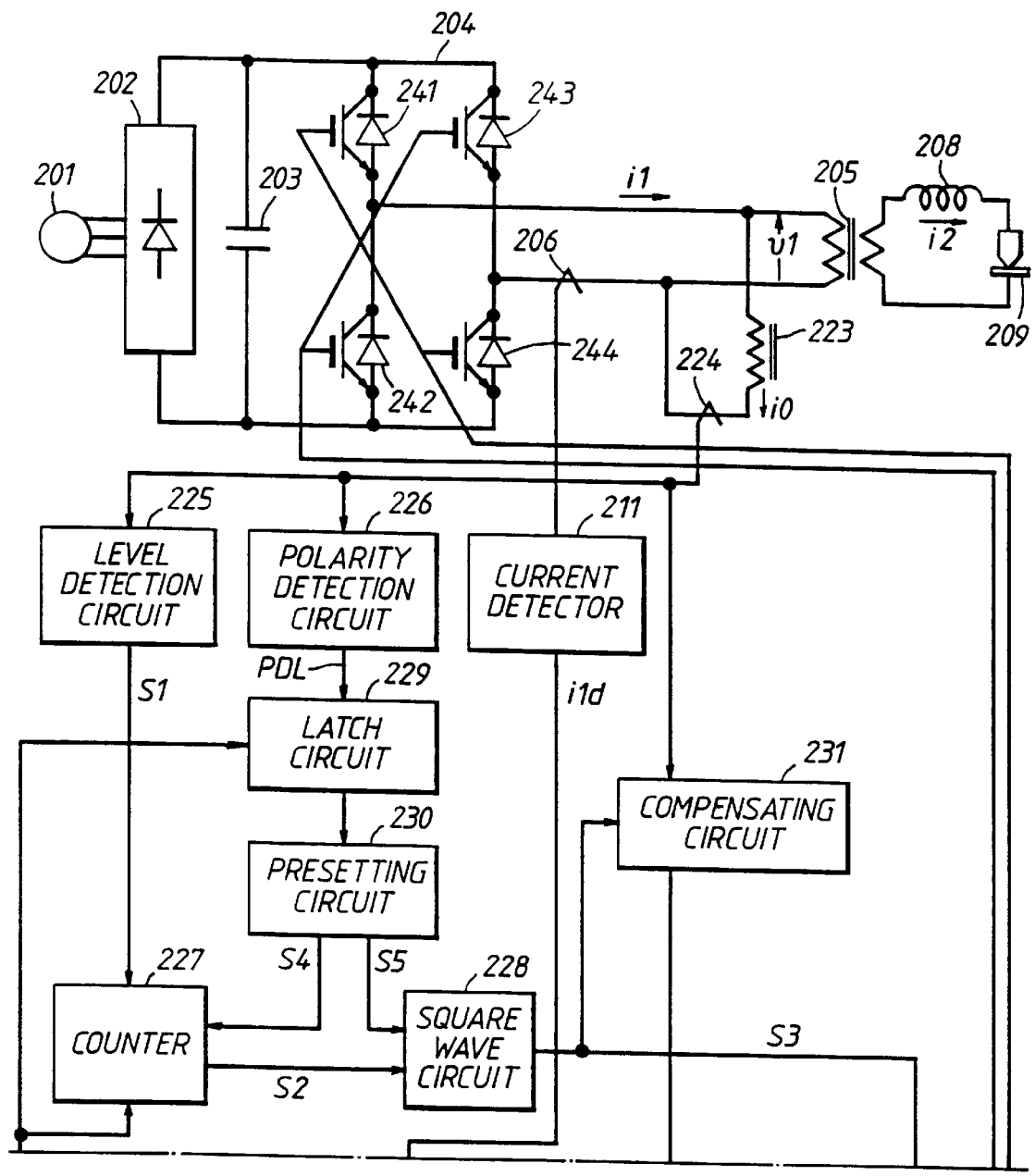
FIG. 14 is a circuit diagram showing a control equipment for a resistance welding machine according to a seventh embodiment of this invention.
Figure 14:
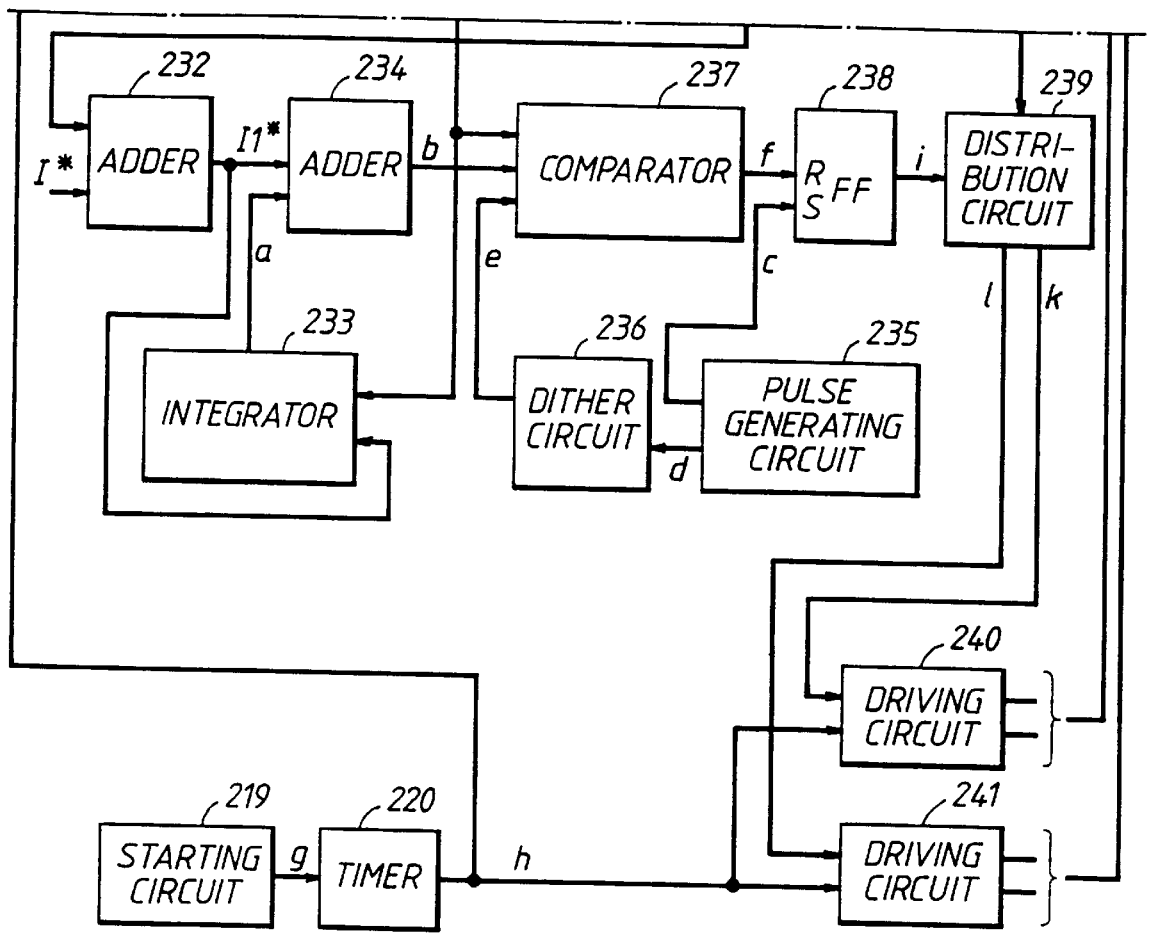

FIG. 14 shows a seventh embodiment of this invention. The gist of this embodiment is to provide a PWM control unit for generating a DC current reference and for PWM controlling the inverter based on a PWM signal composed of an ON PWM signal and an OFF PWM signal, so that an error between an output current of the inverter and the DC current reference becomes zero. The PWM control unit includes a reference control unit for generating a reference control signal based on the DC current reference, a pulse width modulating unit for generating the ON PWM signal at a constant modulation cycle and for generating the OFF PWM signal based on a result of comparing the reference control signal and the output current of the inverter, a square wave generating unit for generating a square wave signal for determining a polarity and frequency of the AC voltage outputted from the inverter, and a driving unit for controlling the inverter in response to the PWM signal and the square wave signal. Based on the basic composition of this embodiment, PWM control of the inverter is executed by instantaneous control.

Figure 45:
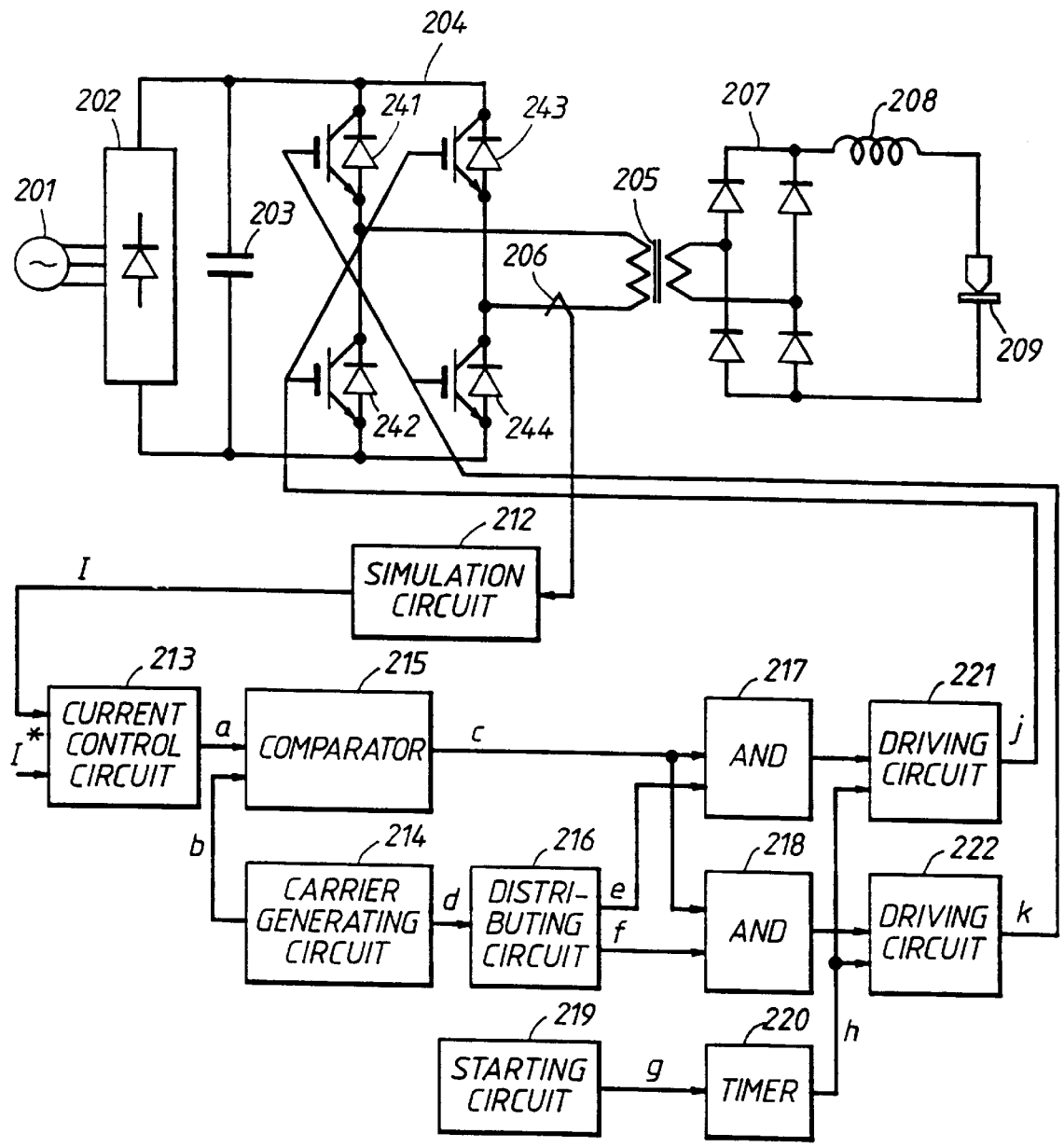
FIG. 45 is a circuit diagram showing another example of a prior art control equipment for a resistance welding machine.

In FIG. 14, 223 is a small capacity reactor which simulates the exciting current of transformer 205, in which the flux saturation characteristic of the iron core approximates to the characteristic of the iron core of transformer 205. 224 is a current transformer for detecting an exciting current i0 flowing in reactor 223. 225 is a level detector which outputs a signal s1 when the absolute value of exciting current i0 flowing in reactor 223 exceeds a specified value. 226 is a polarity detector which outputs a polarity signal POL by discriminating the polarity of exciting current i0. 227 is a counter which includes a constant frequency clock pulse generator, and while conduction signal h is active it outputs a pulse signal s2 every time a constant number of clock pulses is counted and, at the same time zero clears and repeats the counting. It is forced by signal s1 to output signal s2 and to zero clear, and is preset to a specified count number by signal s4 while conduction signal h is active. 228 is a square wave circuit which outputs a square wave signal s3 of a specified frequency with two values, in which the two values (1, 0) invert every time pulse signal s2 is inputted, while conduction signal h is active. The value of square wave initially outputted from square wave circuit 228 is determined by a signal s5 from a presetting circuit 230. 229 is a latch circuit which, when conduction signal h becomes inactive, holds polarity signal POL at that time. Presetting circuit 230 outputs signals s4 and s5 to execute the initial settings of counter 227 and square wave circuit 228 in response to the value of polarity signal POL held by latch circuit 229. 231 is a compensating circuit which outputs a compensation signal i01 in which the polarity of input signal of exciting current i0 is inverted in response to the value of square wave signal s3. 232 is an adder which outputs a current reference I1* for the output of inverter 204 which has been compensated by adding (welding) current reference I* and compensation signal i01. 233 is an integrator which outputs a control signal a by integrating the error of current reference I1* and an absolute value i1d of inverter output current i1 detected by a current detector 211. 234 is an adder which outputs a current control signal b by adding current reference I1* and control signal a. 235 is a pulse generator which outputs a pulse signal c with a constant modulation cycle T1 and, at the same time, outputs a rectangular wave synchronized signal d with a duty of 50% . 236 is a dither circuit which outputs a saw-toothed wave dither signal e which monotonously increases within the modulation cycle in synchronization with synchronized signal d. 237 is a comparator which compares control signal b and the value of dither signal e added absolute value i1d of the inverter output current, and outputs a pulse signal f when the polarity of that differential value inverts. 238 is a flip-flop which outputs an ON PWM signal j set by pulse signal c and, at the same time outputs an OFF PWM signal j reset by pulse signal f. 239 is a distributing circuit which outputs signals k and l to control respective driving circuits 240 and 241 for the control of inverter 204 in response to square wave signal s3 and PWM signal j. The remainder is the same as in prior art shown in FIG. 45 and is given the same symbols.

Also, the operation of level detector 225, polarity detector 226, counter 227, square wave circuit 228, latch circuit 229 and presetting circuit 230 have been described in detail in a previously described fourth embodiment shown in FIG. 6. Here, the parts which concern the operation of this embodiment are described with reference to FIGS. 15 to 18.

In the above composition, when starting signal g for the conduction start is inputted from starting circuit 219, timer 220 makes conduction signal h active only during the set welding time. By this means, counter 227 starts a count of the internal clock pulse and outputs pulse signal s2 at a specified cycle. Square wave circuit 228 outputs square wave signal s3 by inverting the two values every time pulse signal s2 is inputted. The value of this square wave signal s3 operates as the signal which determines the polarity of the AC output voltage of inverter 204. Distributing circuit 239 outputs control signals k and l to switch ON the respective switching devices of inverter 204 in response to the value of square wave signal s3. The functions of driving circuits 240 and 241 become effective while conduction signal h is active. Driving circuits 240 and 241 switch ON the respective switching devices 242, 243 and 241, 244 in response to control signals k and l. Thus, inverter 204 outputs voltage v1 of a polarity corresponding to the value of square wave signal s3 to supply current i2 to the primary side of transformer 205.

Pulse generator 235 outputs pulse signal c with constant modulation cycle T1. Flip-flop 238 is set by pulse signal c and outputs ON PWM signal j. However, when inverter output current i1 increases, its absolute value signal i1d detected by current detector 211 increases. When it reaches the target value, pulse signal f is outputted from comparator circuit 237, and flip-flop 238 is reset by pulse signal f and outputs OFF PWM signal j. Here, PWM signal j is composed of ON PWM signal j and OFF PWM signal j. Thus, the supply of power from inverter 204 is suspended. By this means, current i1 in the primary side of transformer 205 starts to decrease. Flip-flop 238 is set every modulation cycle T1 to return inverter 204 to the original ON state. Thus, as shown in FIG. 15, PWM control is executed by, so-to-speak, instantaneous control, which is the gist of this embodiment.

When the welding current target value is applied as current reference I*, the target value of inverter output current i1 is determined by signal b outputted from adder 234. That is to say, in adder 232 compensation signal iO1 outputted from compensating circuit 231 is added to primary side current reference I* which corresponds to the welding current. Thus, current reference I1* which has been compensated by an amount equivalent to the exciting current of transformer 205 is outputted from adder 232. Also, signal a obtained by integrating the error between this current reference I1* and absolute value i1d of the inverter output current is outputted from integrator 233. Adder 234 adds current reference I1* and signal a, and outputs this added value as target value b of inverter output current i1.

Figure 15:
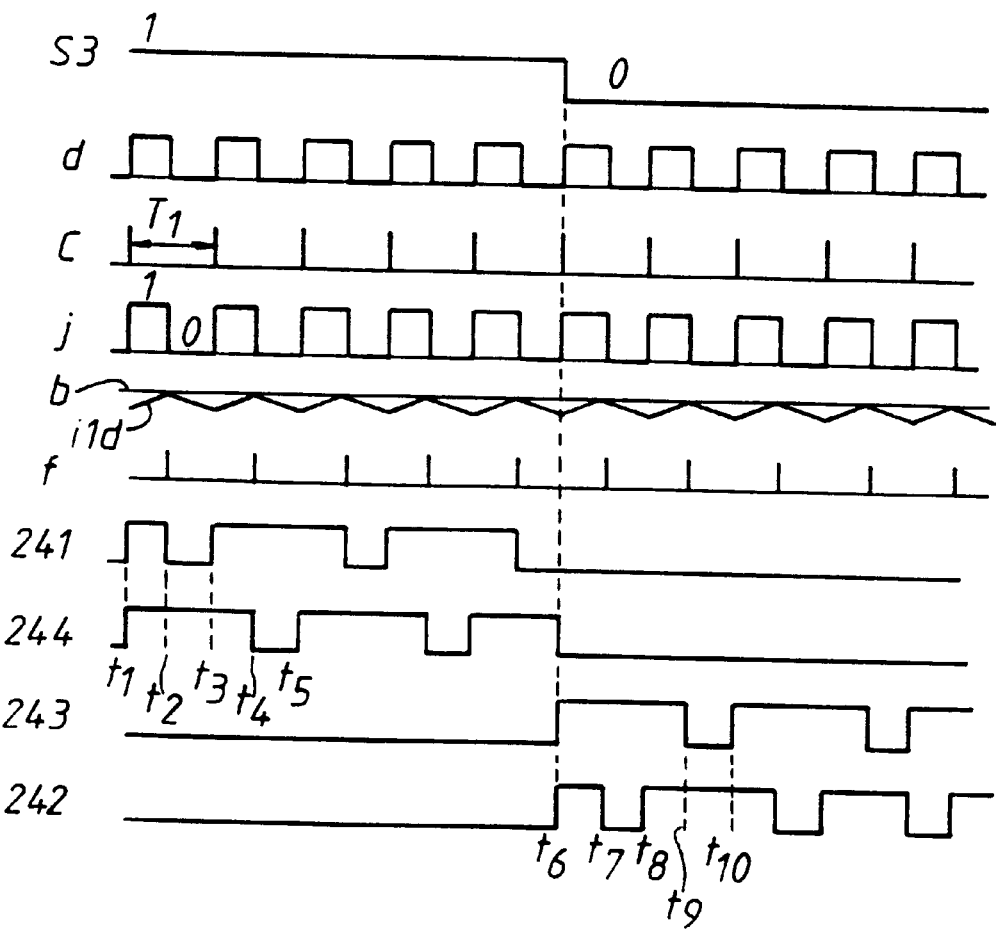
FIG. 15 is a drawing to illustrate the operation of the embodiment in FIG. 14.

As shown in FIG. 15, distributing circuit 39 controls each of switching devices 241–244 of inverter 204 via driving circuits 240, 241 in response to square wave signal s3 and PWM signal j. When square wave signal s3 is "1", inverter 204 is operated such that switching devices 241 and 244 are operated to output positive voltage level v1. When square wave signal s3 is "0", inverter 204 is operated such that switching devices 243 and 242 are operated to output negative voltage v1. Also, when PWM signal j is ON instruction "1", both switching devices 241, 244 or both switching devices 243, 242 are rendered ON as shown by t1-t2 and t3-t4, or t6-t7 and t8-t9, respectively.

Figure 16A:
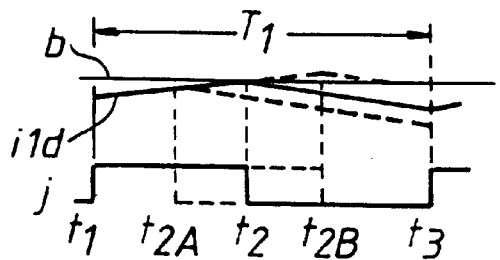
FIGS. 16a, 16b are drawings to illustrate the operation of the embodiment in FIG. 14.

When PWM signal j is OFF instruction "0", only one of switching devices 241, 244, or only one of switching devices 243, 242 is alternatively rendered OFF as shown by t2-t3 and t4-t5, or t7-t8 and t9-t10, respectively. By exercising switching control in this way, when PWM signal j is an OFF instruction, current i1 flowing in the primary side of transformer 205 refluxes via inverter 204 without being regenerated to the DC power source side. Therefore the decrease of current i1 is reduced and ripple can be reduced. Thus, the switching frequency of the switching devices 241–244 can be made the equivalent of ½. When square wave signal s3 changes from "1" to "0", the switching ON of switching device 242 is executed with a delay of several μs, which is called a "dead time", so that a DC short will not arise due to delayed action of switching device 244. However, in the case when switching control is executed in this way, when inverter current i1 reaches the target value and flows stably, the variation width of the error value between signal b and absolute value i1d reduces. As shown in FIG. 16(a), the judgement time of comparator 237 is influenced as shown by a time t2A and a time t2B due to the penetration of slight noise. Thus, the pulse width of PWM signal j changes significantly and inverter output current i1 sometimes becomes unstable.

Figure 16B:
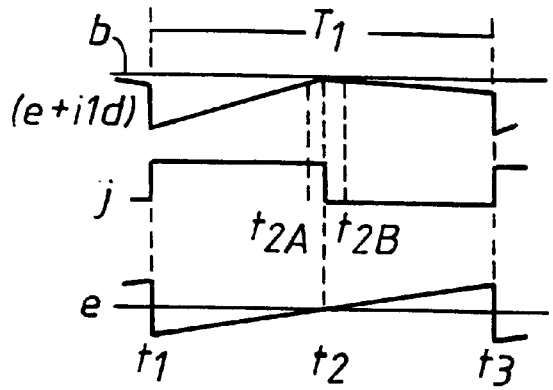

In this embodiment, dither circuit 236 is provided to alleviate the effect of this noise. Dither circuit 236 outputs a saw-toothed dither signal e as shown in FIG. 16(b), based on signal d which is outputted in synchronization with modulation cycle T1. Comparator 237 operates to compare signal b with this signal e added to absolute value i1d of the inverter output current. By this means, the apparent error value is increased at a time separated from target time t2 at which PWM signal j is made OFF, and thus the effect of noise can be alleviated as shown at a time t2C and a time t2D. Also, the error between current reference I1* and inverter output current absolute value i1d generated by the introduction of this dither signal e is compensated by signal a outputted from integrator 233.

Figure 17:
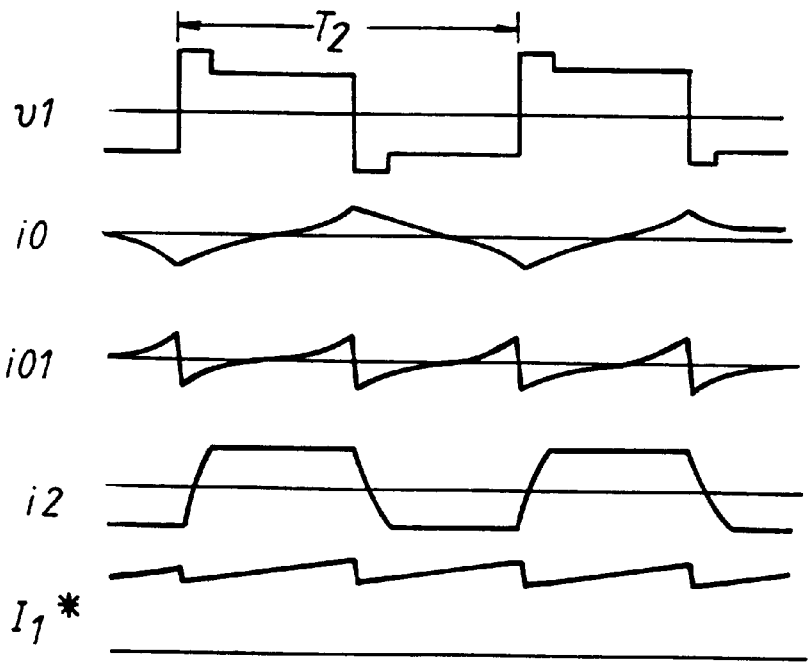
FIG. 17 is a drawing to illustrate the operation of the embodiment in FIG. 14.

Inverter 204 outputs AC voltage v1 such as shown in FIG. 17, in response to cycle T2 of square wave signal s3 and applies it to the primary side of transformer 205. Thus AC welding current i2 of square wave form is supplied from the secondary side. Current i1, with the addition value of a current corresponding to welding current i2 and the exciting current of transformer 205, flows in the primary side of transformer 205. Exciting current i0, which approximates to the exciting current of transformer 205, flows in reactor 223. From exciting current i0 of reactor 223 detected by current transformer 224, compensating circuit 231 generates compensation signal i01, in which the polarity is inverted every half-cycle in response to the value of square wave signal s3. In adder 232, compensation signal i01 is added to current reference I* which determines the welding current, to generate current reference I1* for determining inverter output current i1, which has been compensated by an amount equivalent to the exciting current of transformer 205

When welding current i2 is large (close to 100%), the exciting current of transformer 205 can be ignored. However, when the welding current is small (less than 20%), the exciting current of transformer 205 becomes 5–10% or more of the welding current, and the error becomes larger. However, when using this embodiment, this error is eliminated and a welding current with good accuracy can be supplied.

Figure 18A:
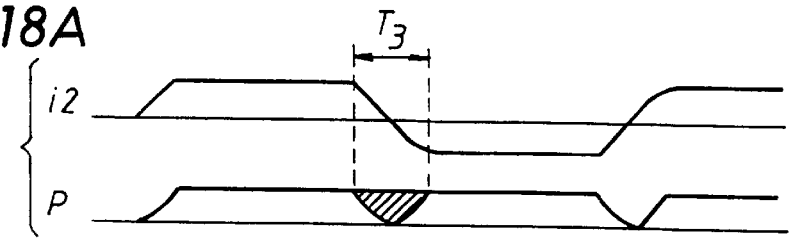
FIGS. 18a, 18b are drawings to illustrate the operation of the embodiment in FIG. 14.

Integrator 233 also performs the action of compensating the reduction of welding power during the transient period in which the polarity of welding current i2 inverts. That is to say, in the case of integrator 233 not being provided, as shown in FIG. 18(a), welding current i2 changes with a specified rate of change of current determined by the circuit constant in the transient period T3 in which the polarity inverts. This current i2 is controlled so that it becomes constant when it reaches the target welding current. Therefore, welding power P (the square of welding current i2) reduces by the portion shown by the hatching in transient period T3, and the temperature of the weld part reduces.

Figure 18B:
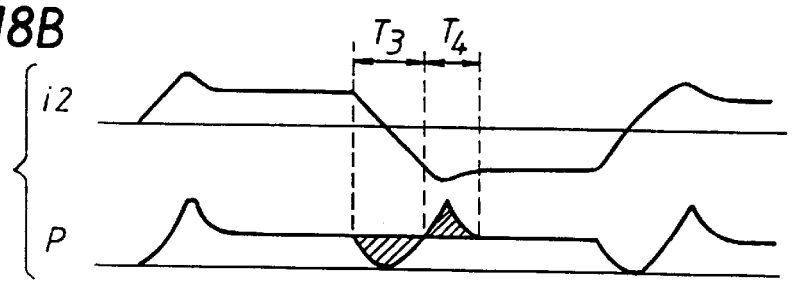

When integrator 233 is provided, however, welding current i2 overshoots during only a period T4 immediately after transient period T3, as shown in FIG. 18(b), and stabilizes at a constant value. The error between current reference I1* and absolute value i1d of the inverter output current is integrated by integrator 233, and this overshoot action is performed by adding that integrated value (signal a) to current reference I1*. By this means, the portion of welding power P reduced during period T3 is immediately compensated in period T4. Thus, the temperature reduction in the weld part can be restored at an early stage.

Figure 19:
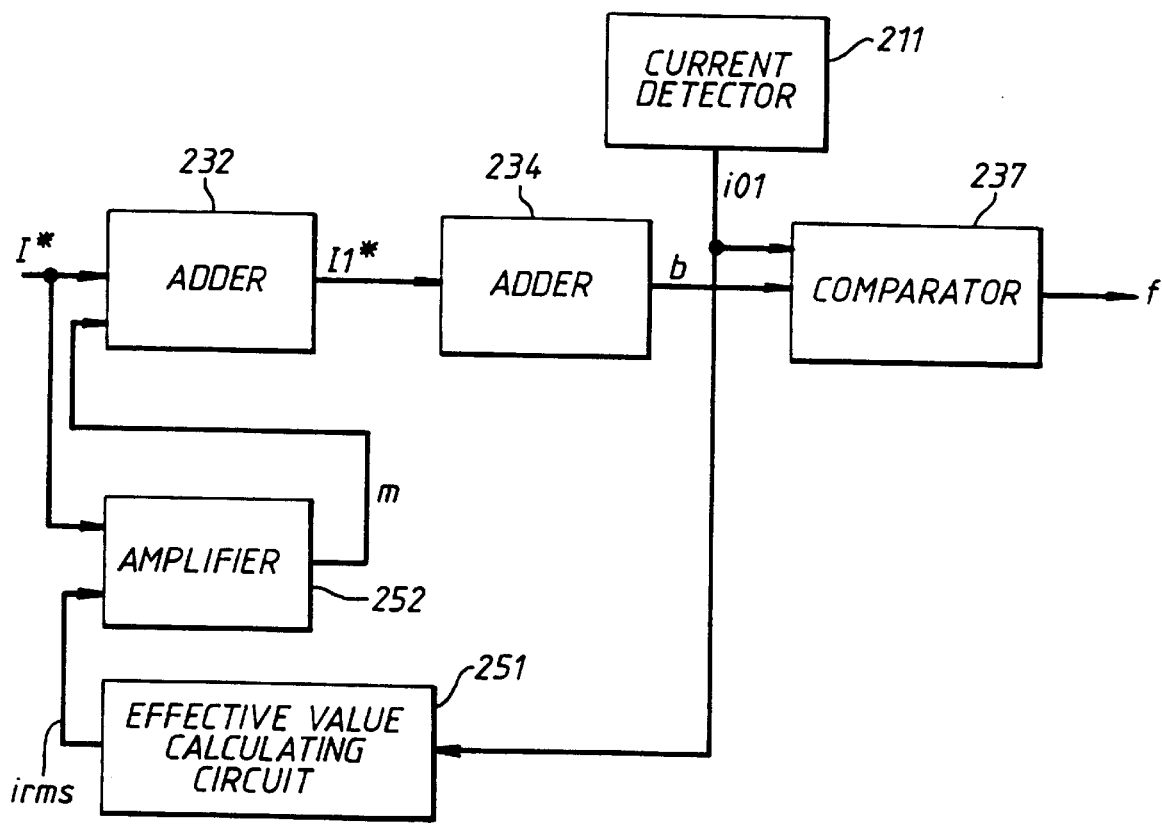
FIG. 19 is a circuit diagram showing the essential parts of a control equipment for a resistance welding machine according to an eighth embodiment of this invention.

FIG. 19 shows an eighth embodiment of this invention. This embodiment finds an effective value irms of the inverter output current by an effective value calculating circuit 251 from inverter output current i1d detected by current detector 211. The error between welding current reference I* and effective value irms is amplified by an amplifier 252 to generate a signal m. Signal m is added to current reference I* in adder 232, and outputted as inverter output current reference I1*. When using this embodiment, the reduced portion of the effective value during the transient period in which the polarity of the welding current inverts is compensated. Thus, the amount of heat generated in the weld part can be uniformly controlled.

Figure 20A:
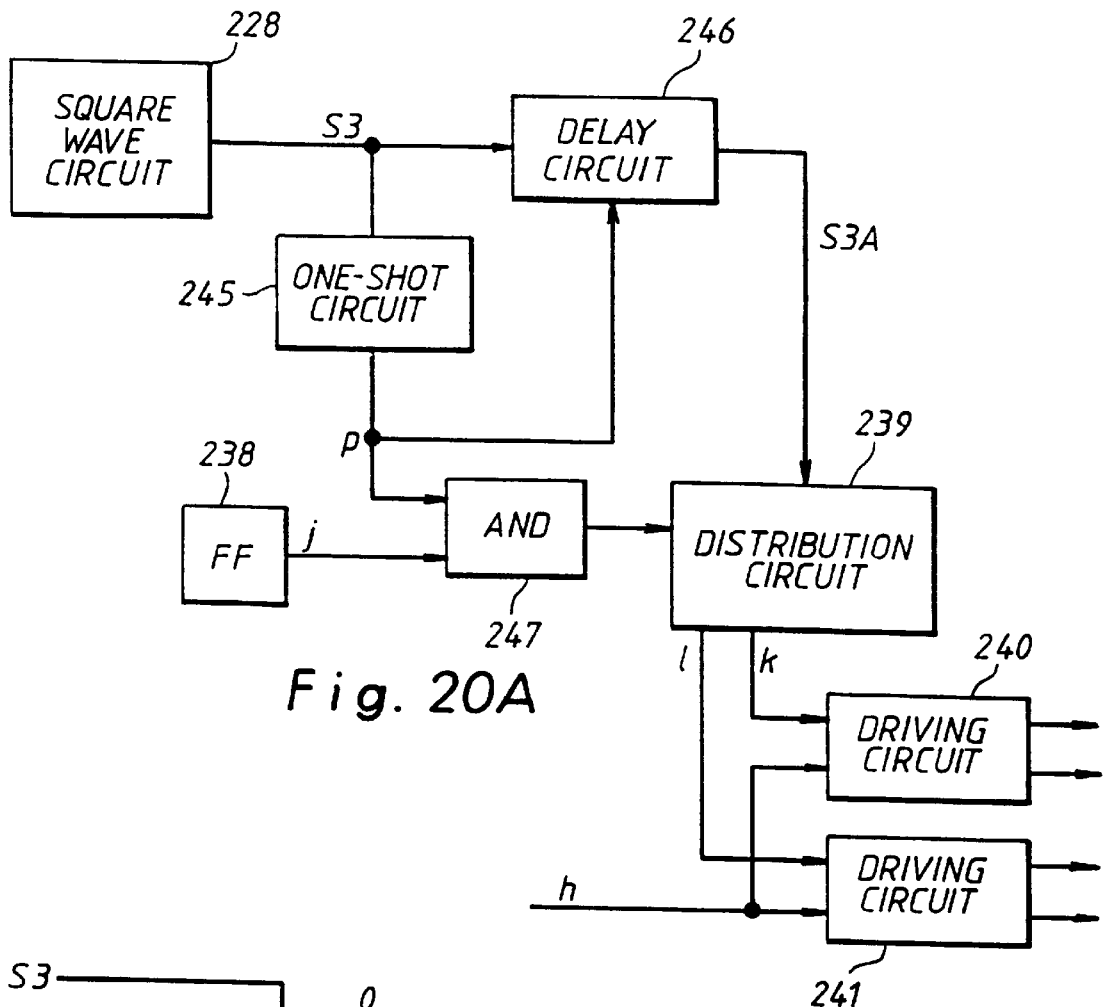
FIGS. 20a, 20b are diagrams showing a control equipment for a resistance welding machine according to a ninth embodiment of this invention.
Figure 20B:
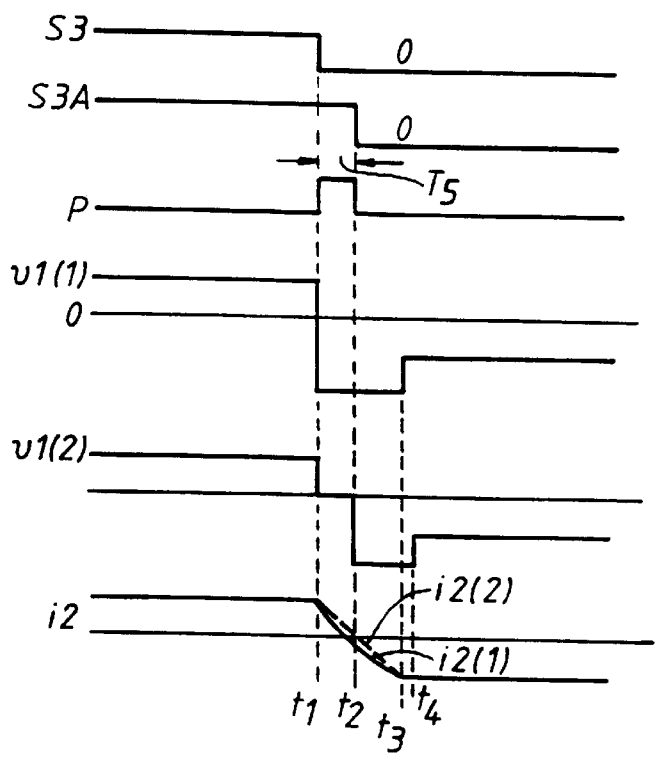

FIG. 20(a) shows a ninth embodiment of this invention. This embodiment adds a device for reducing the flux density of transformer 205 after polarity inversion in the transient period in which the polarity of the welding current inverts. That is to say, every time the value of square wave signal s3 changes, a pulse signal P with a specified width T5 is outputted from a one-shot circuit 245. This signal P is applied to a delay circuit 246 which outputs a square wave signal s3A, with a change delayed by only specified period T5, by square wave signal s3. At the same time, pulse signal P closes the gate of an AND circuit 247 and forcibly generates an OFF PWM signal, which is applied to distributing circuit 239. By this means, distributing circuit 239 controls the switching devices of inverter 204 so that the value of square wave signal s3 is the value before changing (the value "1" in the Figure) and inverter 204 becomes in the zero voltage output mode (the state in which the primary side current of transformer 205 refluxes via the inverter) during times t1–t2. The output voltage of inverter 204 becomes zero voltage, as shown by an output voltage v1(2) in FIG. 20(b). When pulse signal P is extinguished at time t2, square wave signal s3A outputted from delay circuit 246 changes to the same value (the "0" state in the Figure) as that of normal square wave signal s3. As the same time, the gate of AND circuit 243 is opened and normal PWM signal j is outputted. Thus, distributing circuit 239 executes normal switching control. Therefore, the output voltage of inverter 204, as shown by output voltage, v1(2), is outputted as a negative voltage corresponding to the value of square wave signal s3A. A forcing voltage is outputted during times t2–t4 till the target value is reached, and then output voltage v1(2) becomes constant at the value at which the welding current is supplied. Also, for comparison, in the case when the zero voltage output mode is not provided, when the polarity of the output voltage is inverted, an output voltage and a welding current have been shown as v1(1) and i2(1).

When using this embodiment, the time in which welding current i2(2) inverts becomes slightly longer. However, as the time product of voltage v1(2) impressed on transformer 205 becomes zero during times t1–t2, it becomes smaller than that of voltage v1(1) during times t1–t4. This indicates a low flux density, and shows that transformer 205 can be miniaturized.

Figure 21A:
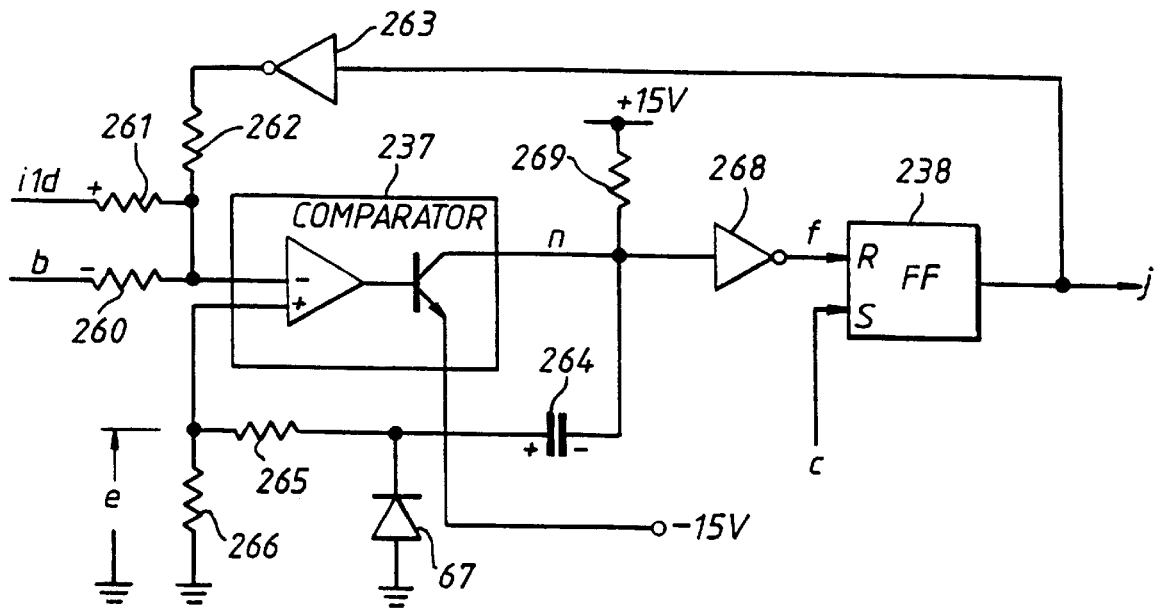
FIGS. 21a, 21b are diagrams showing a control equipment for a resistance welding machine according to a tenth embodiment of this invention.
Figure 21B:
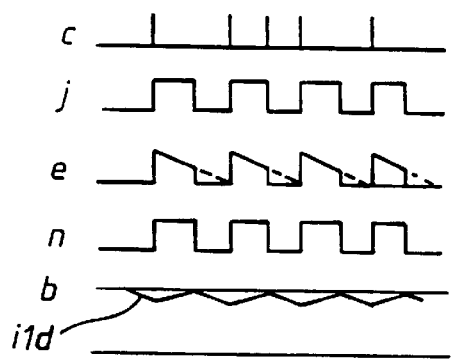

FIG. 21(a) shows a tenth embodiment of this invention. In FIG. 21(a), 260 and 261 are resistors. The object of this embodiment is that the generation of dither signal e is simplified. That is to say, when ON PWM signal j is outputted, the bias values added to the input of comparator 237 via an inversion circuit 263 and a resistor 262 by ON PWM signal j are made zero, and an output n of comparator 237 is reset to a specified value (the high level state in FIG. 21(b)). By changing output n to high level, a displacement current flows through a differential circuit composed of a capacitor 264 and resistors 265 and 266, so that it is possible to obtain saw-toothed dither signal e. This dither signal e is applied to an input terminal (+) of the same phase of comparator 237. As a result, it is added to absolute value i1d of the inverter output current. Then, when output n of comparator 237 changes to a low level (-15 V) by the differential value between control signal b and the value in which dither signal e is added to inverter output current i1d, flip-flop 238 is reset via an inversion circuit 238 and OFF PWM signal j is outputted. The bias values are once more added to comparator 237, and capacitor 264 is charged with a voltage of the polarity shown in FIG. 21(b). In this embodiment, a dither signal can be generated in a simplified circuit construction.

When using these seventh to tenth embodiments of this invention, as an AC square wave welding current is supplied, welding electrode wear is reduced and the frequency of electrode exchange is also reduced. Therefore, the availability factor can be improved. Also, the current control response characteristic is improved, and at the same time the noise resistance characteristic is improved, and welding current ripple can be reduced. Moreover, temperature reduction of the welding part in the welding current polarity inversion time can be compensated. At the same time, the exciting current portion of the transformer can be compensated. Therefore, a highly accurate welding current can be supplied, and good quality welding can be performed. Furthermore, the flux utilization factor of the transformer is improved, and the transformer can be miniaturized.

Hereinafter, other embodiments of this invention will be described. In these embodiments the inverter is PWM controlled by, so-to-speak, instantaneous control, the same as seventh embodiment shown in FIG. 14.

Figure 22:
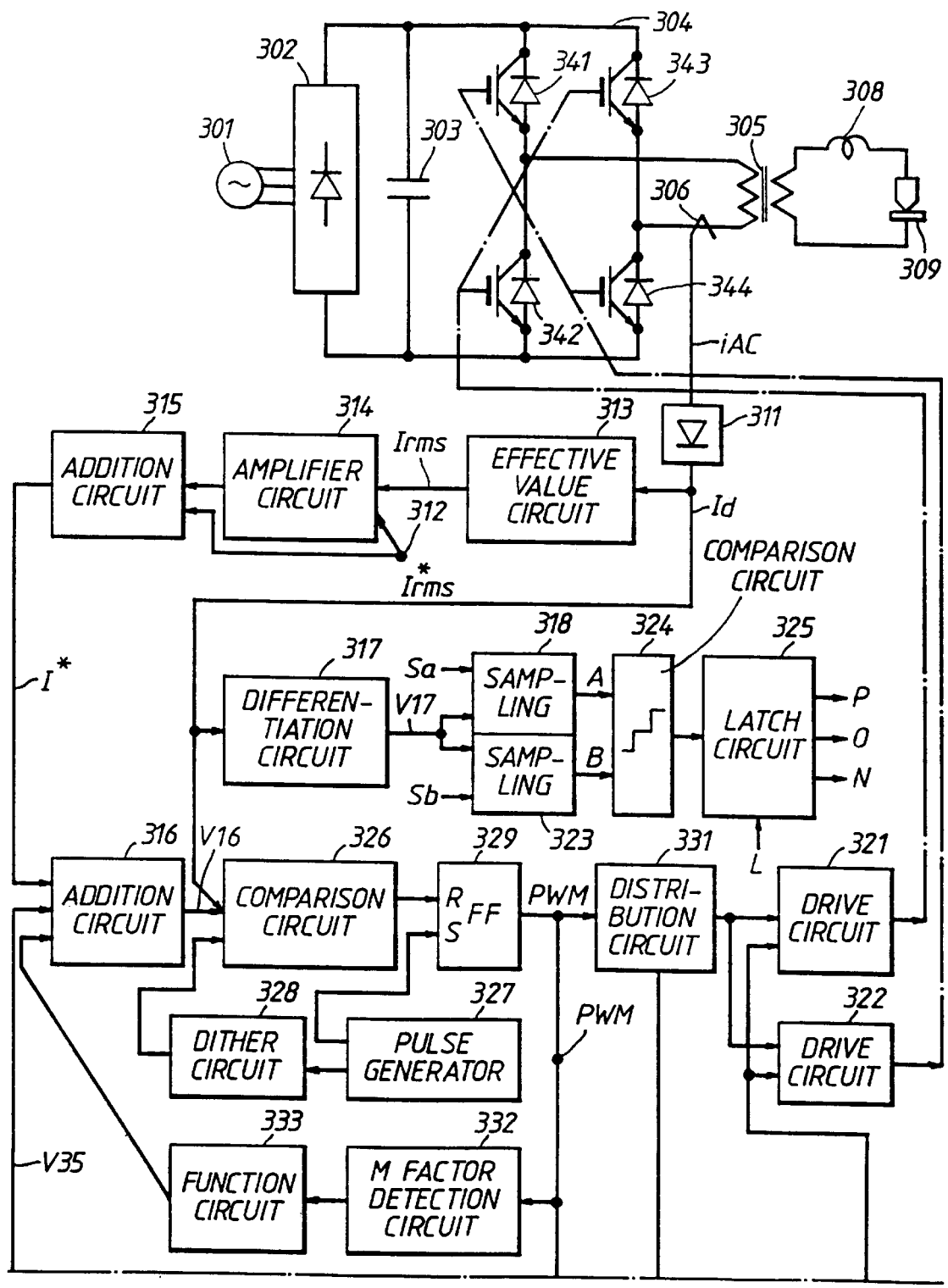
FIG. 22 is a circuit diagram showing a control equipment for a resistance welding machine according to an eleventh embodiment of this invention.
Figure 22:
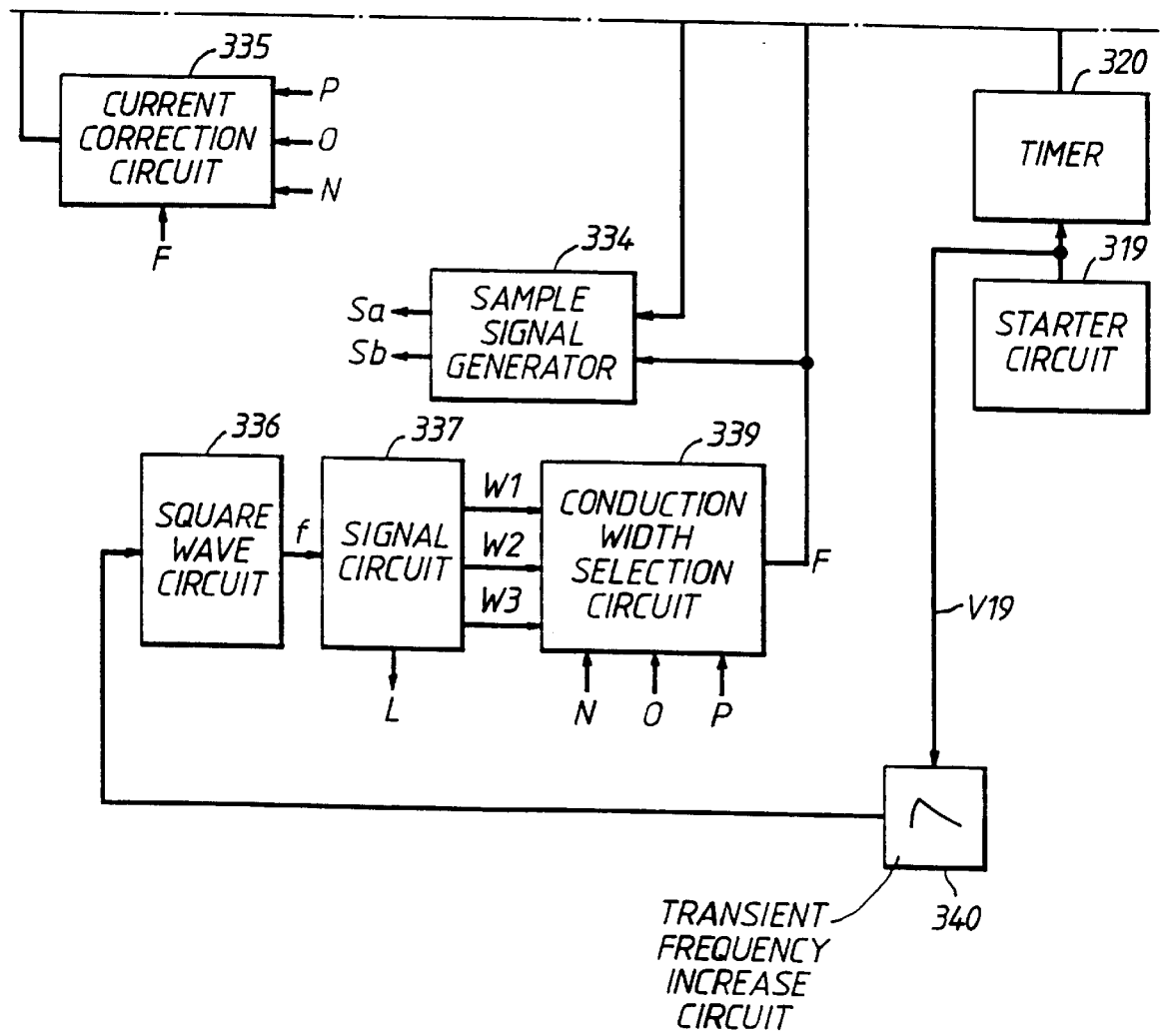
Figure 23:
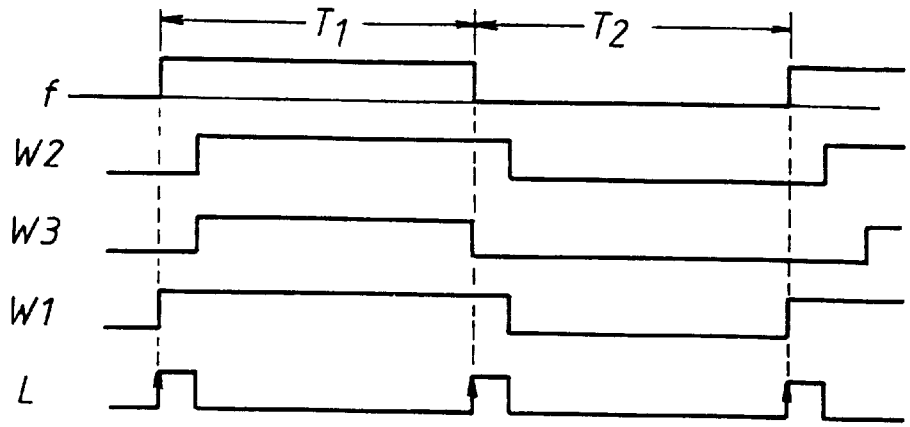
FIG. 23 is a drawing to illustrate the operation of the embodiment in FIG. 22.

FIG. 22 shows a circuit diagram of a control equipment for a resistance welding machine according to an eleventh embodiment of this invention. In FIG. 22, the AC voltage of AC power source 301 is converted to a DC voltage by rectifier 302. After this has been smoothed by capacitor 303, it is converted to a high frequency AC voltage of about 1 kHz by an inverter 304 composed of switching devices, for instance IGBT (insulated gate bipolar transistors) 341–344. The output of inverter 304 is supplied to welding electrodes 309 via a transformer 305. In this case, leakage inductance 308 is present in the wiring to welding electrodes 309 from transformer 305.

The primary current of transformer 305 is detected by a current transformer 306. This detected AC current is rectified to a DC current Id by a rectifier circuit 311. An effective value circuit 313 finds an effective value Irms from DC current Id.

An amplifier circuit 314 amplifies the error between effective value Irms and an effective value reference Irms* applied to amplifier circuit 314. The output of amplifier circuit 314 is added to effective value reference Irms* in an addition circuit 315 as a correction signal so that the error of amplifier circuit 314 becomes in the decrease direction.

Thus, addition circuit 315 outputs a new current reference I*, which is outputted to addition circuit 316.

Addition circuit 316 adds current reference, I* an output V35 from a current correction circuit 335, which is described later, and an output of a function generation circuit 333, which is also described later. Thus, addition circuit 316 outputs an output V16, as a final current reference.

A comparison circuit 326 compares output V16 of addition circuit 316 and DC current Id which is the output of rectifier circuit 311. This error output of comparison circuit 326 is inputted to a reset terminal R of a flip-flop 329. A signal from a pulse generator 327, described later, is inputted to a set terminal S of flip-flop 329.

Pulse generator 327 generates a modulation frequency, signal, which is inputted to set terminal S of flip-flop 329, and sets the output flip-flop 329 to "1" on its rising. This becomes the polarity which switches ON the IGBTs of inverter 304.

When output Id of rectifier circuit 311 becomes large than output V16 of addition circuit 316, the output of flip-flop 329 becomes "0" by the output of comparison circuit 326. That is to say, the output of flip-flop 329 becomes a PWM signal.

At the same time, the output of pulse generator 327 is inputted to a dither circuit 328. Dither circuit 328 generates a dither signal with a triangular waveform which gradually increases or gradually decreases every modulation cycle. The dither signal is inputted to comparison circuit 326. By the above composition, the design is to output a PWM signal which is proof against noise.

A modulation factor (M factor) detection circuit 332 detects the modulation factor by inputting the PWM signal which is the output of flip-flop 329. This detected modulation factor is inputted to addition circuit 316 via function circuit 333 as the current accuracy correction input.

Also, the PWM signal, which is the output of flip-flop 329, and an AC current polarity signal F from conduction width selection circuit 339, described later, are inputted to distribution circuit 331. The PWM signal is distributed by distribution circuit 331 to drive circuits 321 and 322, which drive the IGBT of inverter (inverter bridge), 304 based on signal F. A starter circuit 319 outputs a conduction signal to start a timer 320 to render drive circuits 321 and 322 operational only during the conducting time of timer 320.

Apart from the composition described above, this embodiment is provided with the composition for preventing the DC magnetization of transformer 305. That is to say, a sample signal circuit 334 inputs AC current polarity signal F from conduction width selection circuit 339, described later, and the PWM signal from flip-flop 329, and outputs sample signals Sa and Sb. A differentiation circuit 317 detects a current change rate V17 of DC detected current Id which has been rectified by rectifier circuit 311. A sampling hold circuit 318 inputs sample signal Sa from sample signal circuit 334 and current change rate V17 of differentiation circuit 317, and outputs an output A by sampling and holding current change rate V17 at the time of final PWM in a half cycle of the AC current. Also, a sampling hold circuit 323 inputs sample signal Sb from sample signal circuit 334 and current variation factor V17 of differentiation circuit 317, and outputs an output B by sampling and holding current change rate V17 at the time of final PWM in a half cycle of the AC current.

A comparison circuit 324 compares the magnitudes of outputs A and B of sampling hold circuits 318 and 323. When those of A and B are roughly equal, it outputs "0". Also, when B>+α (α is the window width of comparison circuit 324), it outputs "P". Furthermore, when B<A−α, it outputs "N".

A latch circuit 325 discriminates the results of the level comparison in comparison circuit 324 into three levels, Plus (P), Zero (O) and Minus (N) using a latch signal L from a signal circuit 337, described later.

A current correction circuit 335 receives AC current polarity signal F from conduction width selection circuit 339, described later, and executes current correction (correction of the DC component) in response to outputs P, O and N from latch circuit 325 to generate an output V35.

A square wave circuit 336 inputs a signal from a transient frequency increase circuit 340, described later, and determines an inverter output frequency f. Signal circuit 337 inputs inverter output frequency f from square wave circuit 336, and outputs three conduction width signals W1, W2 and W3.

Conduction width selection circuit 329 receives outputs P, O and N from latch circuit 325 and three conduction width signals W1, W2 and W3. It selects one of signals W1, W2 and W3 based on outputs P, O and N and outputs the selected one as AC current polarity signal F to sampling signal circuit 334 and distribution circuit 331.

Also, transient frequency increase circuit 40 inputs conduction signal V19 from starter circuit 319 and generates a signal to increase frequency f of square wave circuit 336 only for an initial specified duration on starting.

The operation of the eleventh embodiment composed as above are explained with reference to FIGS. 23 to 26. First, the output waveform of signal circuit 337 is described with reference to FIG. 23. Output signal f of square wave circuit 336 is the signal which determines the frequency of the inverter output current, and pulse-widths T1 and T2 are equal. W2 is a signal slightly delayed from output signal f, and their pulse-widths of the "1" and "0" intervals are equal. W3 is a signal in which the "1" interval of W3 is narrower than that of W2. W1 is a signal in which the "1" interval of W1 is wider than that of W2. Latch signal L rises at the time output signal f changes, and latch circuit 325 latches the data, which are "P", "O" and "N" of comparison circuit 324, at the time latch signal L rises. Conduction width selection circuit 39 selects one out of conduction width signals W1, W2 and W3 from signal circuit 337 based on outputs P, O and N of latch circuit 325 and outputs the selected one as output signal F.

Figure 24:
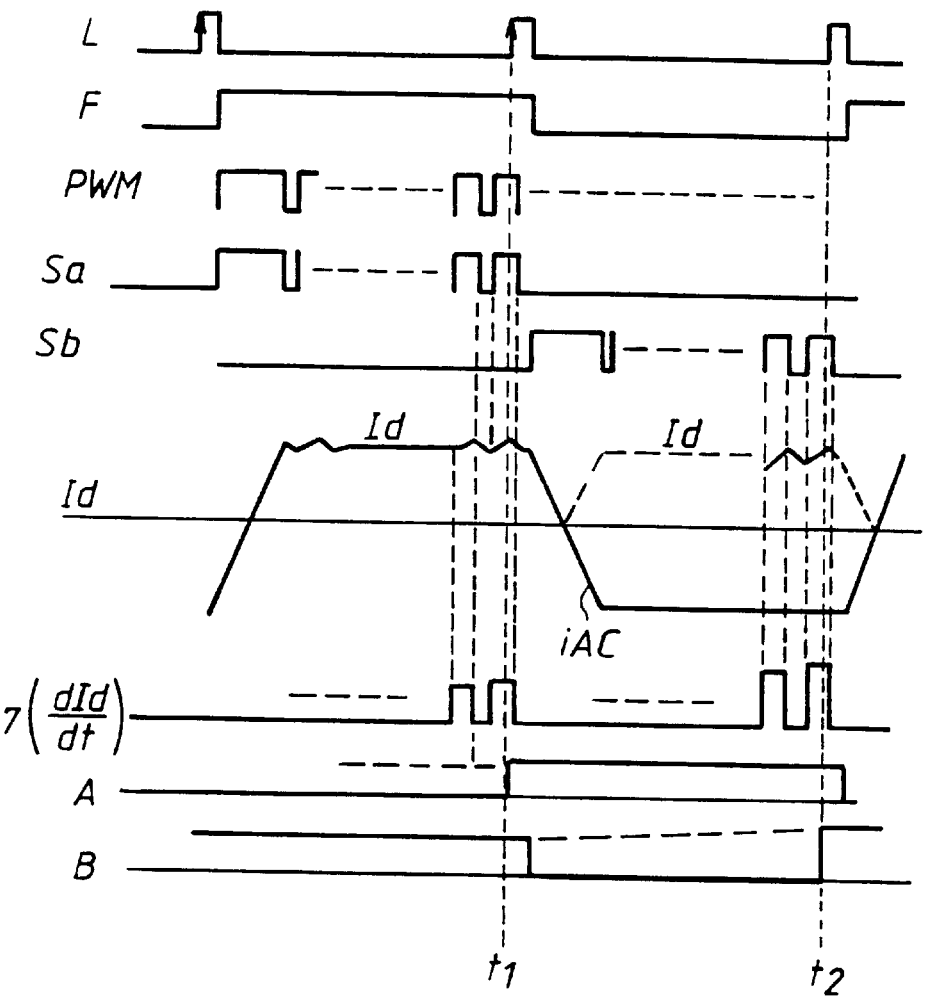
FIG. 24 is a drawing to illustrate the operation of the embodiment in FIG. 22.

Next, the detection operation of the polarity of DC magnetization is described using FIG. 24. When there is no DC magnetization at present and latch circuit 325 is outputting O, conduction width selection circuit 39 outputs signal F by selecting conduction width signal W2 in FIG. 23. That is to say, it is assumed that it is control in which the positive/negative conduction widths of the inverter output are equal.

Inverter output current iAC is rectified by rectifier circuit 311 to become DC current Id. As IGBTs switch ON in the "1" interval of the PWM signal, the output current of inverter 304 increases. As IGBTs switch OFF during the "0" interval of the PWM signal, the output current of inverter 304 decreases.

By receiving the PWM signal and F signal, sampling signal circuit 334 outputs signals Sa and Sb. Sampling hold circuits 318 and 323 sample and hold current change rate V17 for every half-cycle of the AC current based on signals Sa and Sb, and output the results as outputs A and B, respectively.

Current change rate V17 at a time t1 is held to become output A. Current change rate V17 at a time t2 is held to become output B. The output of latch circuit 325 is outputted at three levels P, O and N by comparing these outputs A and B at the rising point of latch signal L. The following is the details of outputs P, O and N. When A and B are roughly equal at time t2, it becomes an O output. When B>A+α (α is window width of comparison circuit 324), P output is outputted. That is to say, it is considered, from the fact that current changer rate (dId)/(dt) is large in the "0" period of signal F, that transformer 305 is polarized and the excitation current has increased. Therefore, DC magnetization can be prevented by shortening the "0" period of signal F.

For this reason, in the case of signal P being outputted, conduction width selection circuit 339 shortens the "0" period of signal F by switching from signal W2 to signal W1 at time t2. In the case of B<A-α, it becomes the N output. In the case of the "1" period of signal F, transformer 305 is DC magnetized in the saturation direction. Therefore, it is sufficient to output signal F by selecting signal W3. This selection is performed every half-cycle.

Figure 25:
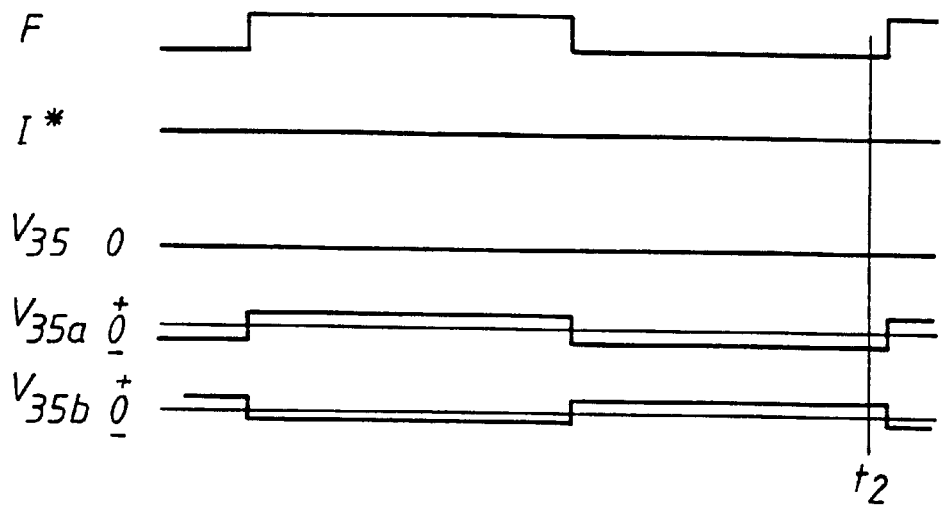
FIG. 25 is a drawing to illustrate the operation of the embodiment in FIG. 22.

Next, current correction circuit 335 is described with reference to FIG. 25. That is to say, when latch circuit 325 has outputted P output at time t2, as illustrated in FIG. 24, transformer 305 is in the saturation direction in the "0" period of signal F. Therefore, DC magnetization can be prevented reducing the current value in this period and increasing the current value where signal F is in the "1" period. This is because the composition is such that the output of current correction circuit 335 becomes V35a.

Also, when latch circuit 325 outputs O at time t2, the output of current correction circuit 335 becomes V35o, that is to say zero output. Thus, no current correction is performed.

Moreover, when latch circuit 325 outputs N at time t2, current correction circuit 335 outputs V35 in the same way, and DC magnetization of transformer 305 can be prevented by reducing the current in the period where signal F is "1".

Apart from providing both current correction circuit 335 and conduction width selection circuit 339 as shown in FIG. 22, even if only one or the other is provided, there is hardly any change in the operation. However, in the case of the AC current frequency being made variable, when the frequency becomes high conduction selection circuit 339 becomes the stronger, and when the frequency is low current correction circuit 335 becomes the stronger.

Figure 26:
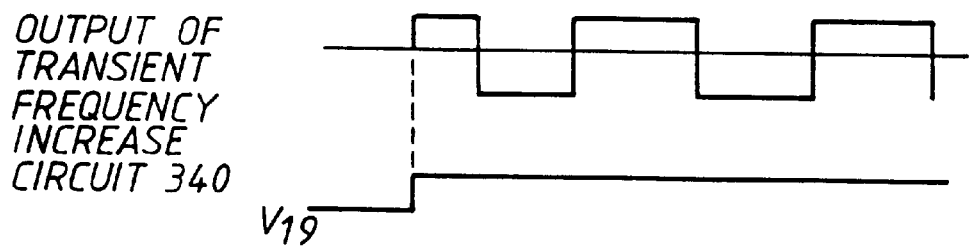
FIG. 26 is a drawing to illustrate the operation of the embodiment in FIG. 22.

The following is a description of the operation of transient frequency increase circuit 340 with reference to FIG. 26. In transformer 5, the magnetic flux density of the core immediately before the start of conduction is influenced by residual flux. It is shifted in the direction of the final flux density of the previous conduction to a position slightly higher than zero.

Therefore, when the frequency of the conduction AC is selected from the beginning of conduction, the core readily becomes saturated. With the prior art thyristor or inverter DC method, conduction is started with a narrow width at a constant frequency. However, since this embodiment employs a 180 degree conduction method (in order to improve welding performance), this method as in the prior art cannot be adopted.

For this reason, as shown in FIG. 26, it is devised so that core saturation is avoided by increasing the frequency in the first part (1 cycle in FIG. 26) after starting signal V19 is switched ON.

The shorter this first part, at a half-cycle to 2–3 cycles, the more the waveform factor improves. Therefore, it is possible to use the flux density of transformer 305 effectively, without deterioration of the welding quality. That is to say, the first half-cycle on starting is controlled taking note of the fact that only about 50% of the flux variation width can be used.

Figure 27:
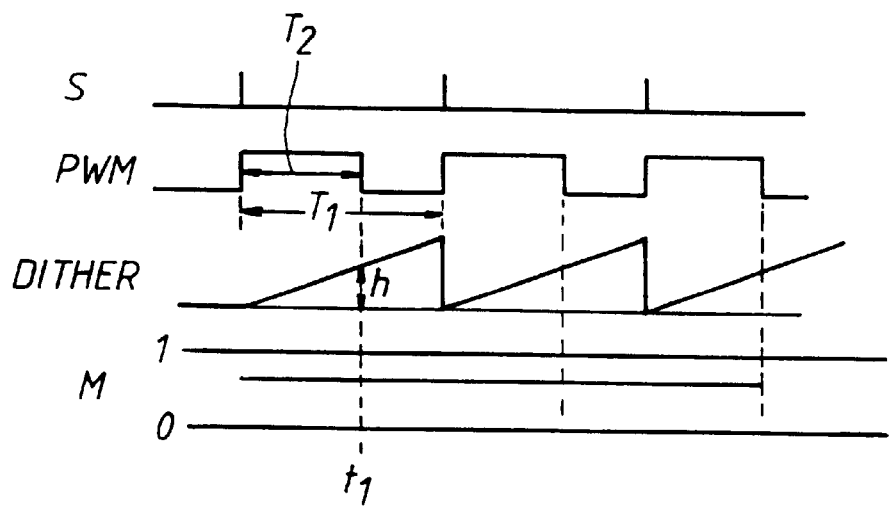
FIG. 27 is a drawing to illustrate the operation of the embodiment in FIG. 22.

The following is a description of improvement of the current accuracy by dither correction, with reference to FIG. 27. Set signal S is inputted to flip-flop 329 from pulse generator 327 every modulation cycle. Thus the PWM signal is switched ON. The final current reference, which is output V16 of addition circuit 316, and the detected current Id are compared by comparison circuit 326. When detected current Id becomes greater than the final current reference V16, the PWM signal shifts to "0" (OFF). A dither signal with a saw-toothed waveform, which is synchronized with the modulation frequency is outputted from dither circuit 228 to comparison circuit 326 (in FIG. 27, this is added with the same polarity as that of the detected current). A dither signal with a peak of several %–5% of the maximum value of the detected current is added, so that stable pulse-width modulation (PWM) which is proof against noise can be performed.

However, because of this dither signal, the current accuracy at its maximum deteriorates by the peak value of the dither signal. As for dither correction for performing this current control at high speed and with high accuracy the correction of the current reference is provided in this embodiment by modulation factor detection circuit 332 and function generator 333 shown in FIG. 22.

In FIG. 27, at a time t1, the PWM signal is altered "1"→"0" by [current reference−(detected current+dither)] becoming<0. Therefore, it can be seen that the current control error is only the amount h. Concerning the magnitude of this amount h, if, after obtaining modulation factor M, that is to say T2/T1, the current reference is increased by that amount, this will be corrected at the point of the next PWM signal. Therefore, it is possible to obtain a very rapid response. The modulation factor can be corrected by computing T2/T1 with a microprocessor, or the like. However, for simplicity, it is possible to correct with a 2–3 pulse delay by smoothing the PWM signal via a filter.

Figure 28:
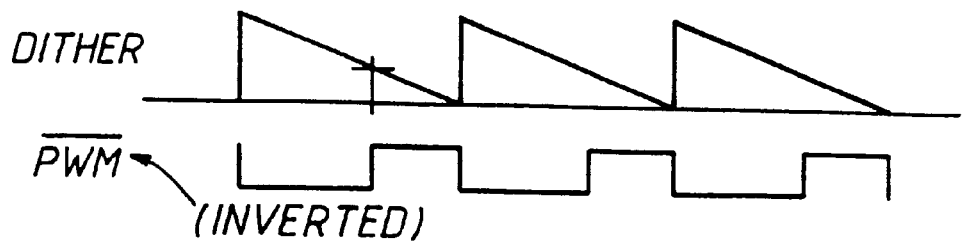
FIG. 28 is a drawing to illustrate the operation of the embodiment in FIG. 22.

In the case of the method of adding the dither signal to the current reference side with a reverse gradient, as shown in FIG. 28, it can be seen that this is obtained from M=(1−inverted PWM signal) after finding the inverted PWM signal.

Figure 29:
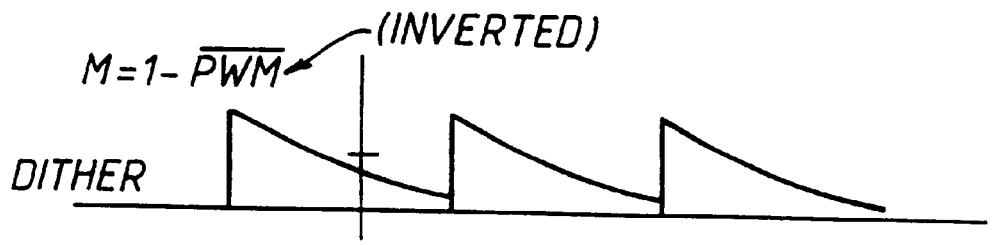
FIG. 29 is a drawing to illustrate the operation of the embodiment in FIG. 22.

Also, in the case of the dither signal being non-linear, as shown in FIG. 29, correction of the non-linearity can be readily achieved by function circuit 233 of FIG. 22.

When using the eleventh embodiment described above, core saturation of transformer 305 is prevented by transiently increasing the AC current frequency when starting. The flux density of transformer 305 can be used to the limit by fine adjustment of the current value and conduction width by detecting the direction of DC magnetization based on the comparison of the change rate of current ripple. As a result, miniaturization can be designed, and therefore it is economical.

Furthermore, a control equipment for a welding machine with which high-quality welding is possible can be provided by exercising current control at high speed and with high accuracy.

Figure 30:
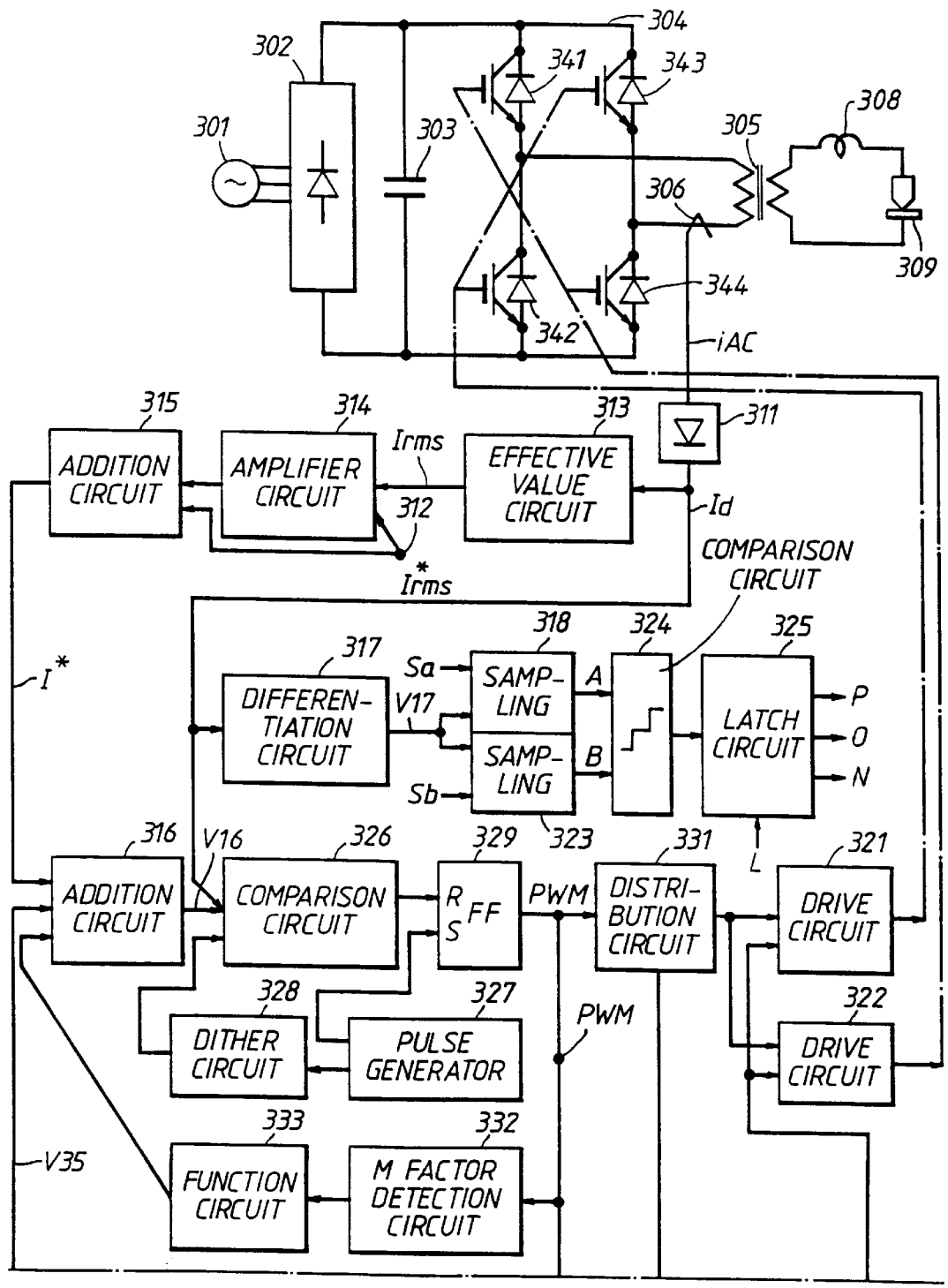
FIG. 30 is a circuit diagram showing a control equipment for a resistance welding machine according to a twelfth embodiment of this invention.
Figure 30:
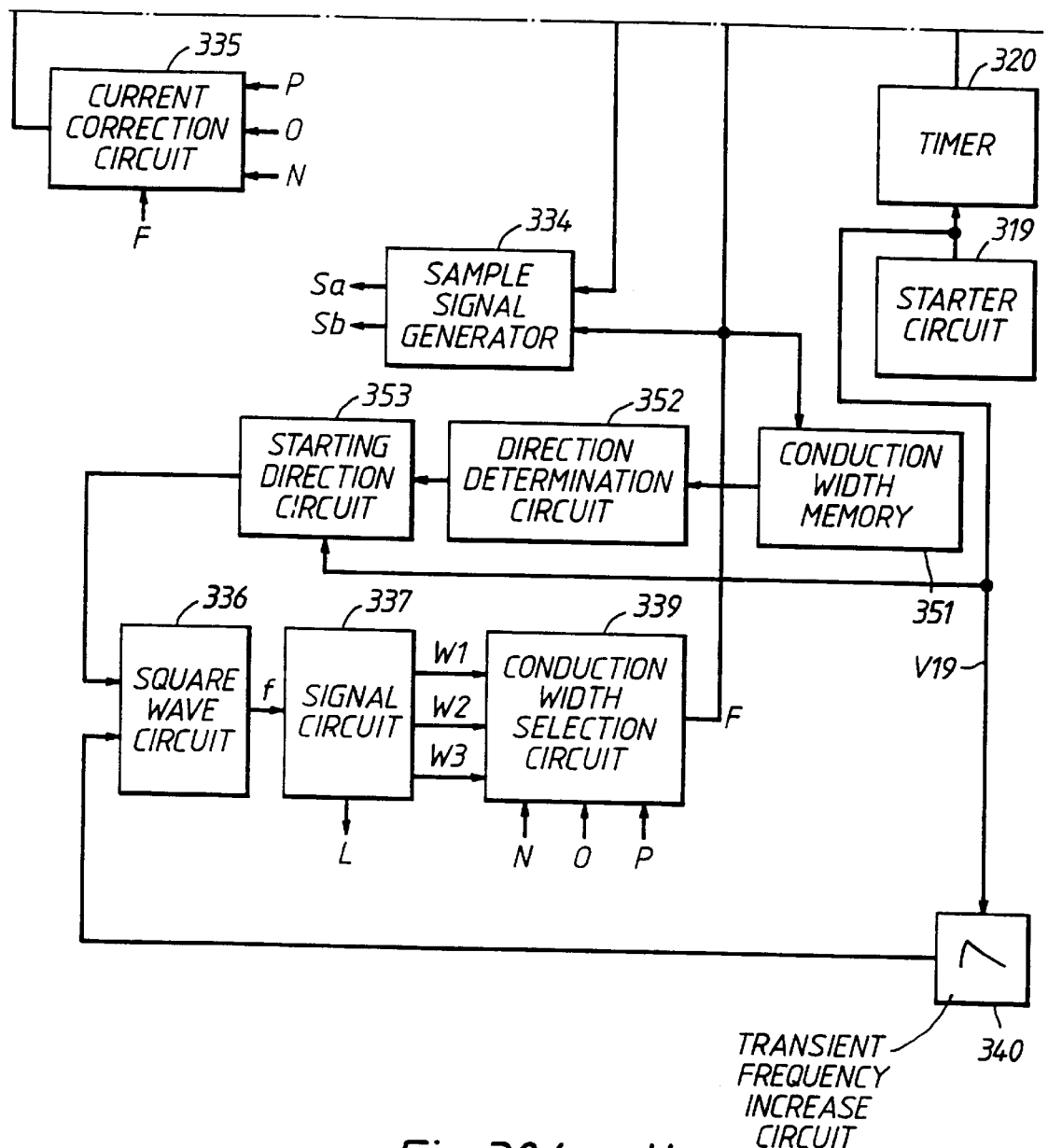

FIG. 30 is a circuit diagram showing a twelfth embodiment of this invention. As shown in FIG. 30, this embodiment is further provided with a conduction width memory 351, a direction determination circuit 352 and a starting direction circuit 353 in addition to the eleventh embodiment shown in FIG. 22. The conduction width of AC current polarity signal F at the time of timer 320 outputting the stop signal is found by conduction memory 351. Direction determination circuit 352 determines the conduction direction at the time of next starting from that result. Receiving starting signal V19 from starter circuit 319, starting direction circuit 353 presets the conduction direction to square wave circuit 336 to start square wave circuit 336. This is very effective when using as the output of inverter 304 an AC frequency which is reduced below the commercial frequency.

Figure 31:
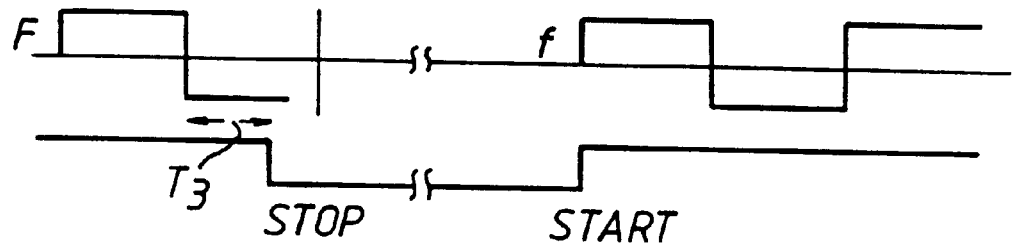
FIG. 31 is a drawing to illustrate the operation of the embodiment in FIG. 30.

As shown in FIG. 31, conduction memory 351 determines the conduction of the next starting cycle by latching the conduction direction and a conduction width T3 at the time of stopping conduction. Conduction is started from the direction where transformer 305 does not saturate. In short, when conduction width T3 is less than 50%, the flux is in the region where it shifts in the zero direction. Therefore, it is designed that at the next start the current flows in the same direction. When conduction width T3 is more than 50%, the flux is in the increase direction after passing zero point. Therefore, it is designed that, at the next start, the current flows in the opposite polarity. Thus the core of transformer 305 can be effectively used.

To be precise, there is voltage forcing. Therefore, it is desirable to determine the next start direction with the point at which conduction width T3 is less than 50% as a boundary.

Figure 32:
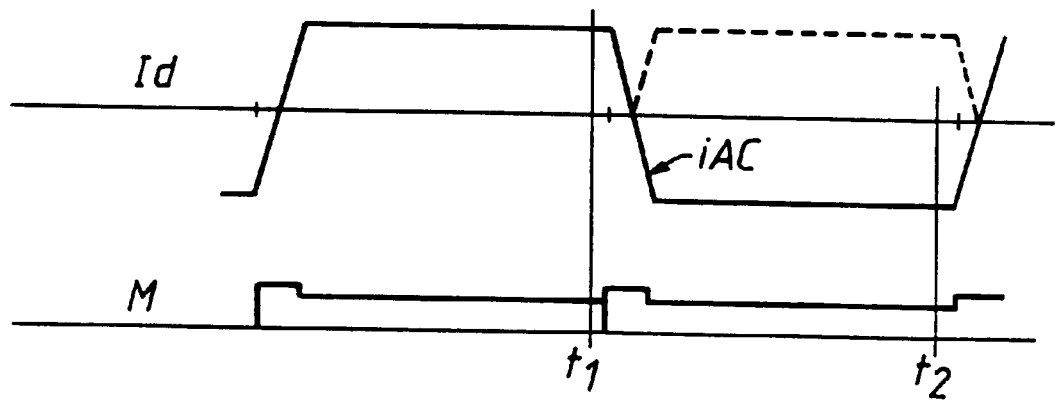
FIG. 32 is a drawing to illustrate a control equipment for a resistance welding machine according to another embodiment of this invention.

In the embodiment in FIG. 22, the DC magnetization of transformer 305 is found from the amount of variation of the primary side ripple current of transformer 305. However, when high-speed current control is exercised, the inverter output will be reduced so that, even if transformer 305 saturates, current Id hardly increases as shown in FIG. 32. For this reason, it is possible to detect the DC magnetization by detecting and comparing modulation factors M at times t1 and t2.

Moreover, in the case of the current increasing through the saturation of transformer 305 as shown in FIG. 32, if the respective values (Id–M) at times t1 and t2 are compared, it is possible to capture the saturation by further enlarging the saturation.

Figure 33:
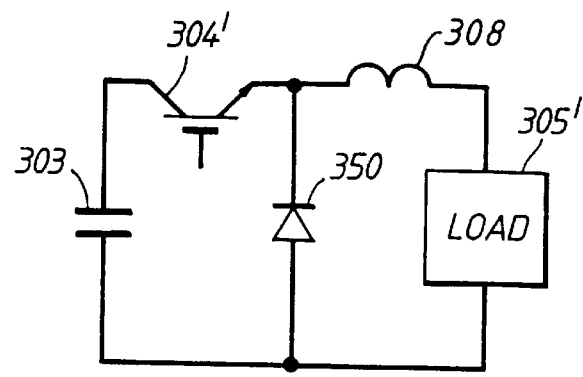
FIG. 33 is a drawing to illustrate a control equipment for a resistance welding machine according to another embodiment of this invention.

Concerning the high-speed current control with high current accuracy illustrated by FIG. 22, needless to explain, this can also be applied in the same way to a chopper circuit shown in FIG. 33, which is composed of a IGBT 304', a diode 350, a reactor 308 and a load 351, such as a laser oscillator. The circuit shown in FIG. 33 is used for small capacity welding machines and pulse welding machines.

The embodiment in FIG. 22 is a system in which output V16 of addition circuit 316 is used as the DC current reference and the frequency is given separately from pulse generator 327. However, it may be composed by producing an AC current reference from output V16 of addition circuit 316 and a frequency, comparing this with AC current iAC detected by current transformer 306 by comparison circuit 326 to generate the PWM signal, and then directly driving drive circuits 321 and 322 using the outputted PWM signal. The same operation and effect as with the embodiment in FIG. 22 can be obtained, even with this method. In this case the control of the current component of DC magnetization correction can be executed by adding the difference between sampling outputs A and B to the AC current reference.

In the control equipment (the circuits except the main circuit) of the embodiment in FIG. 22, all circuits with the exception of rectifier circuit 311, differentiation circuit 317, sampling hold circuits 318 and 323, drive circuits 321 and 322 and starter circuit 319 can be simply achieved by a microcomputer.

Comparison circuit 324 in FIG. 22 executes the discrimination by three levels (P, O, N), and current correction circuit 335 and conduction width selection circuit 339 perform three-level operation, respectively. However, needless to say, roughly the same operational action can be achieved, even when taking two levels by omitting the 0 level.

In the embodiment in FIG. 22, when leakage inductance 308 in the circuit of the welding electrode part is large, the waveform factor deteriorates. Therefore, if a circuit is provided by which the frequency of square wave circuit 336 can be manually set and altered, improvement of the power factor is possible by using a reduced frequency in a circuit into which power cannot be injected because the inductance is large and the power factor is poor. In this case, transformer 305 must be exchanged for a low frequency transformer.

When using the eleventh and twelfth embodiments of this invention, it is possible to provide a control equipment for a welding machine with which high-quality welding is possible, and also in which transformer saturation prevention control can be exercised so that the flux density of the core can be used to the full.

The control equipment for a welding machine shown in FIG. 4 performs PWM control at a constant modulation frequency due to current control based on a rectangular wave current reference. However, the modulation frequency is frequently several kHz. Thus, audible noise caused by the modulation frequency is generated from the welding transformer and the welding machine. This causes discomfort and stress to the welder operator.

In particular, in the case of the modulation frequency being the same as, or close to, the mechanical resonance point of the welding machine, the audible noise is sometimes emphasised.

Also, the current reference waveform is a rectangular wave. Therefore, there is a noise component due to the higher harmonics contained in the rectangular output current. This, together with the above modulation frequency, becomes a cause of audible noise.

For the above reasons, there was a requirement for a design to reduce audible noise and thus reduce the mental stress on the welder operator.

Figure 34:
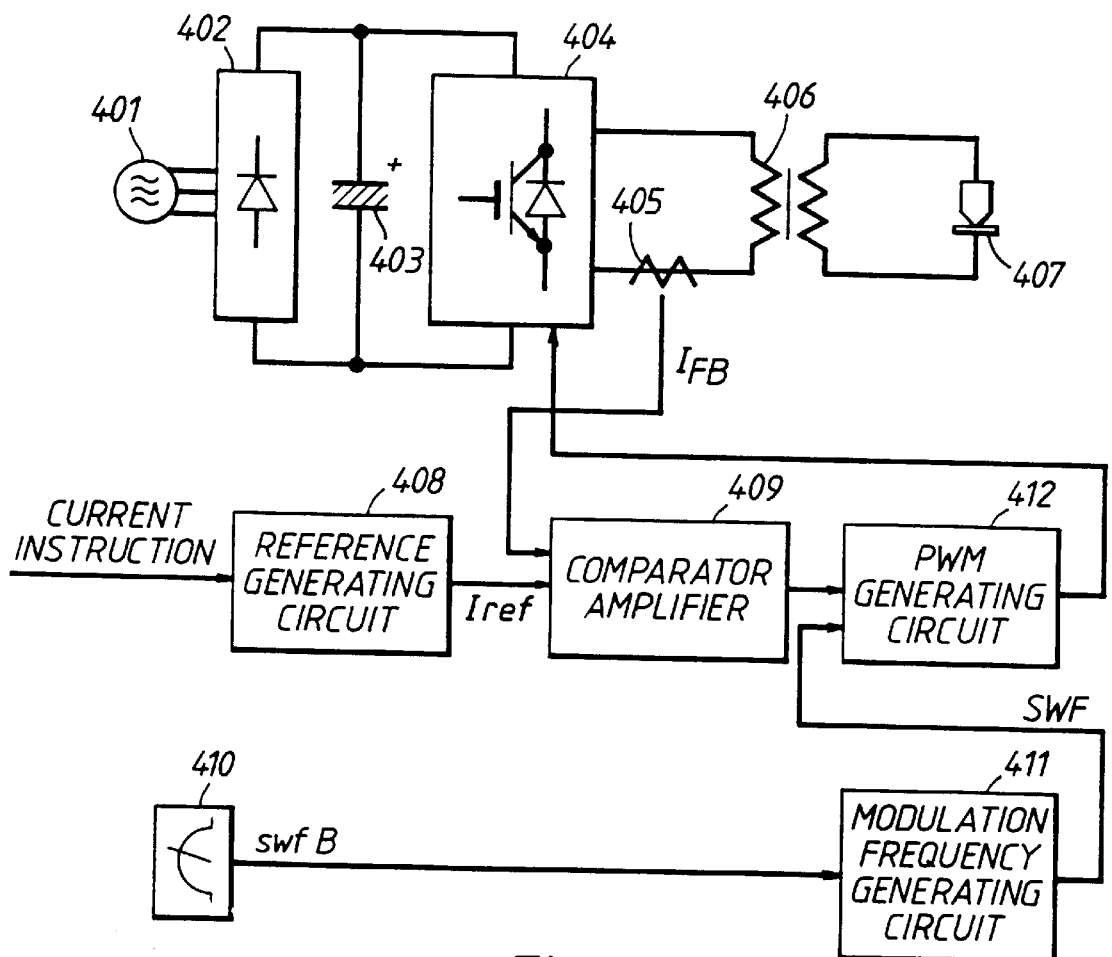
FIG. 34 is a circuit diagram showing a control equipment for a resistance welding machine according to a thirteenth embodiment of this invention.

FIG. 34 shows a control equipment for a welding machine according to a thirteenth embodiment of this invention for solving the above problem.

In FIG. 34, a control equipment for a welding machine is composed of: a rectifying circuit composed of a rectifier 402 which converts an AC power from an AC power source 401 to a DC power, and an electrolytic capacitor 403; an inverter 404 which inverts the DC power from the rectifying circuit to an AC power; a current detector 405 which detects the inverter output current; a reference generating circuit 408 which generates a rectangular waveform current reference Iref in response to an externally set current instruction; a comparator amplifier 409 which amplifies a comparison error between current reference Iref of reference generating circuit 408 and a current feedback IFB from current detector 405; a setter 410 which sets a modulation frequency swfB; a modulation frequency generating circuit 411 in which a modulation frequency is set in response to signal swfB from setter 410; a PWM control circuit 412 which generates a PWM control waveform by an output SWF of this modulation frequency generating circuit 411 and the output from the comparator amplifier 409; a welding transformer 406 which is connected to the inverter output; and a welding head 407 connected to the secondary side of welding transformer 406.

With this composition, it is possible for the welding machine operator to set modulation frequency swfB by setter 410 according to the mechanical conditions of the welding machine.

For this reason it is possible to avoid the mechanical resonance point of the welding machine and thus to suppress the audible noise due to the modulation frequency being at or near the mechanical resonance point. Also, even when there is a frequency at which audible noise is liable to be generated mechanically, it is possible to reduce audible noise by altering the modulation frequency.

FIG. 35 shows a control equipment for a welding machine according to a fourteenth embodiment of this invention.

As against the composition of the embodiment shown in FIG. 34, in the control equipment for a welding machine of this embodiment, an upper limit value limiting circuit 413 which generates a signal IrefB to limit the upper limit value of the current instruction in response to modulation frequency setting signal swfB from setter 410 is inserted between the current instruction and reference generator 408.

The characteristic of the upper limit value limiting circuit 413 is set to that the losses of the main circuit devices do not exceed the specified values for the devices. For this reason, as in the graph shown in FIG. 35, it does not limit the current instruction value in the region where modulation frequency swfB is low, but it performs upper limit value limiting which inclines downward to the right in the region where modulation frequency swfB is high.

With this composition, the upper limit value of the welding current is automatically set according to set modulation frequency swfB.

In the case of the embodiment shown in FIG. 34, by setting modulation frequency swfB high, the switching losses of the main circuit devices increase. However, according to this embodiment the upper limit value of the welding current is limited according to modulation frequency swfB. Therefore, the switching losses of the main circuit devices are restricted within the specified values for the devices.

For this reason, even if the welder operator sets the modulation frequency at will, the upper limit of the welding current is automatically restricted within the equipment capacity. Thus, it is possible to ensure reduction of audible noise together with equipment reliability.

FIG. 36 shows a main part of a control equipment for a welding machine according to a fifteenth embodiment of this invention. As against the composition of the embodiment shown in FIG. 34, the control equipment for a welding machine of this embodiment has a low frequency generating circuit 415 and an adder 414 for adding an output signal swfm from low frequency generating circuit 415 to setting signal swfB from setter 410 between modulation frequency setter 410 and modulation frequency generating circuit 411. Thus, low frequency fluctuation swfm is applied to setting signal swfB to obtain a modulation frequency swf, which is applied to modulation frequency generating circuit 411. As a result, this equipment has a composition which applies a low frequency fluctuation to the modulation frequency.

The level of low Frequency signal swrm to be added can be freely adjusted according to the state of the welding machine.

With this composition, frequency modulation is further performed at low frequency on the set modulation frequency.

In the case of the modulation frequency being constant, since the generated audible noise is also at a constant frequency, the audible noise feels overpowering. However, according to this embodiment, the modulation frequency is continuously being altered at low frequency. Therefore, the noise frequency distribution becomes wider (it becomes white noise). Thus, the overpowering sensation on hearing the audible noise is reduced.

A control equipment for a welding machine according to a sixteenth embodiment of this invention will be described.

In the embodiment shown in FIG. 34, the output of reference generating circuit 408 based on the current instruction is a rectangular wave current reference Iref. In this embodiment, however, reference generating circuit 408 outputs a since wave current reference IrefB based on the current instruction.

With this composition, a sine wave current reference IrefB is outputted from reference generating circuit 408 in response to the current instruction.

In the case of the embodiment shown in FIG. 34, since the conduction current becomes trapezoidal in waveform, the higher harmonic components included in that trapezoidal wave current are felt as audible noise. According to this embodiment, however, since current reference IrefB is a sine wave, audible noise due to the higher harmonic current components possessed by the waveform of the trapezoidal wave is reduced. Thus, the working environment can be improved.

Figures 37A, 37B:
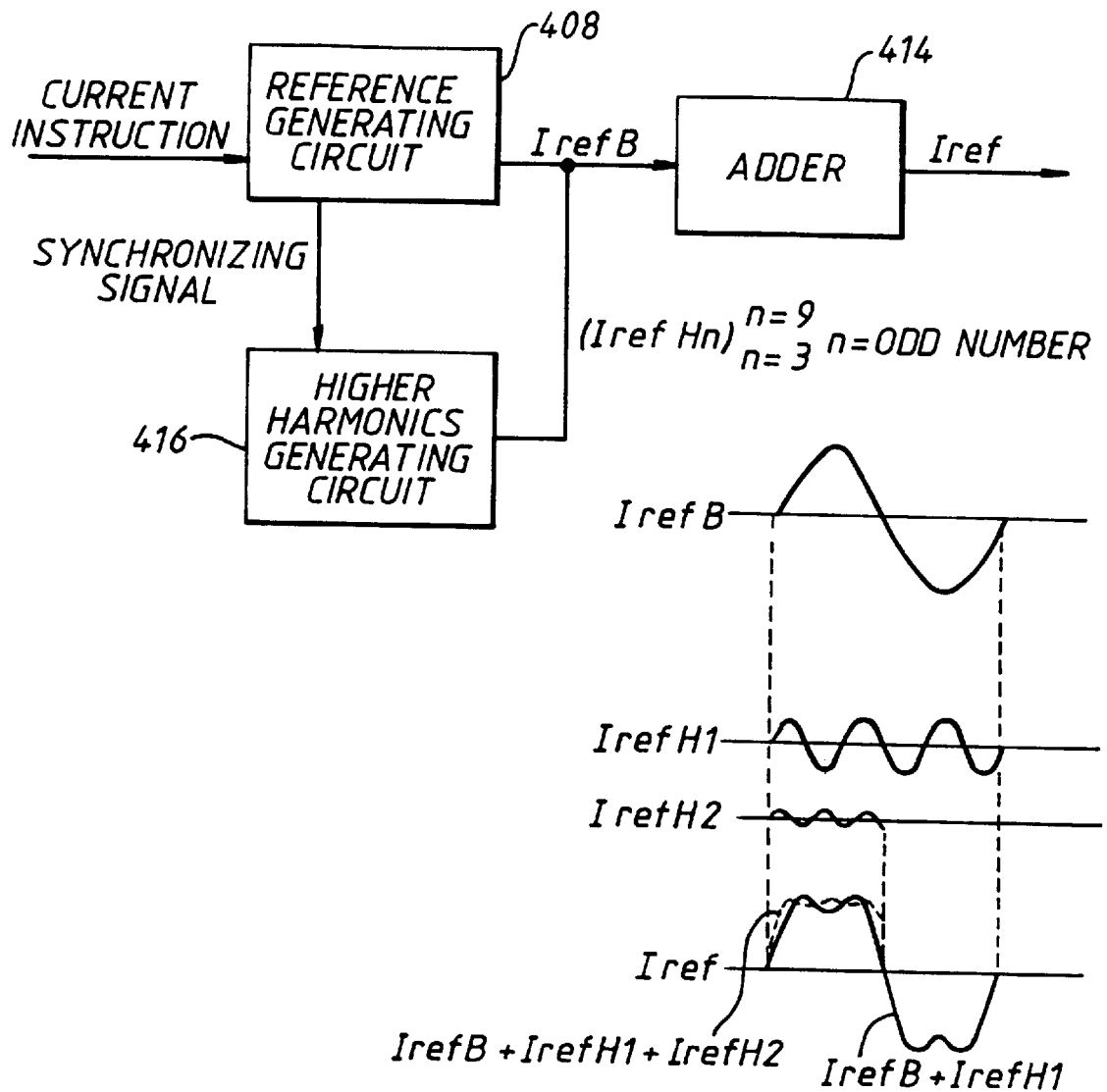
FIGS. 37a and 37b are circuit diagrams showing the essential parts of a control equipment for a resistance welding machine according to a seventeenth embodiment of this invention.

FIG. 37 shows a main part of a control equipment for a welding machine according to a seventeenth embodiment of this invention. As against the composition of the sixteenth embodiment, the control equipment for a welding machine of this embodiment has a composition having a higher harmonics generating circuit 416 which synchronised with sine wave current reference waveform IrefB of reference generating circuit 408 generates higher harmonics IrefHn of the frequency region which do not affect the audible noise characteristic, and an adder 414 which adds sine wave current reference IrefB and higher harmonics IrefHn from higher harmonics generating circuit 416. Thus, in adder 414 higher harmonics IerfHn are superimposed on sine wave current reference IrefB to obtain current reference Iref, which is applied to comparator amplifier 409 shown in FIG. 34.

With this composition, the higher harmonics are superimposed on the sine wave current reference waveform.

In the case of the control performed by the sine wave current as in the sixteenth embodiment although the audible noise is reduced, the welding quality is affected by the great fluctuation of the heat generated in the welding part due to the welding current of the sine wave form. As opposed to this, according to this embodiment the flat portion of the welding current becomes greater and thus the fluctuation of the generated heat can be kept to a minimum by superimposing higher harmonics (3rd order, 5th order,- - - ) of several hundred Hertz or less, to which the ear is less sensitive, on sine wave current reference IrefB. Since the fluctuation of heat generation is reduced, it is possible to improve. the welding quality while reducing audible noise.

FIG. 38 shows a main part of a control equipment for a welding machine according to an eighteenth embodiment of this invention. As against the composition of the sixteenth embodiment, the control equipment for a welding machine of this embodiment has a peak value limiting circuit 417 which limits the peak of sine wave current reference IrefB from reference generating circuit 408 at a constant rate to obtain current reference Iref, Which is applied to comparator amplifier 409 shown in FIG. 34.

With this composition, both the positive and negative sides of the output peak values of sine wave current reference IrefB are equally limited. Thus, current reference Iref is made an approximately trapezoidal waveform.

In the embodiment shown in FIG. 37, apart from a reference generating circuit 408 for generating a sine wave current reference IrefB, another exclusive circuit, that is higher harmonics generating circuit 416, is required. According to this embodiment shown in FIG. 38, however, by providing a peak value limiting circuit 417, current reference Iref becomes close to a waveform in which 3rd and 5th order higher harmonics are added to the current reference IrefB of the sine waveform. For this reason, an exclusive higher harmonics generating circuit is not required. Thus, the optimization of the fluctuation of the heat generated in the welding part is simply possible and, at the same time welding with less audible noise becomes possible.

FIG. 39 shows a main part of a control equipment for a welding machine according to a nineteenth embodiment of this invention. As against the composition of the embodiment shown in FIG. 34, the control equipment for a welding machine according to this embodiment has a composition having a Δf generating circuit 418 which generates a voltage which rises linearly depending on the passage of a conduction time, that is a welding time, with a waveform such as shown in FIG. 39, and an adder 414 which adds setting signal swfB from setter 410 and Δf signal from the Δf generating circuit 418 to obtain a current reference swf. Thus, output swf of adder 414 is inputted to modulation frequency generating circuit 411.

With this composition, the modulation frequency swf rises at a specified rate depending on the conduction time.

The modulation frequency increases with the passage of the welding time. Therefore, the frequency distribution of the audible noise is dispersed on the time axis. Thus, the overpowering sensation on the hearing is reduced compared with the case when the modulation frequency is constant.

Figure 40:
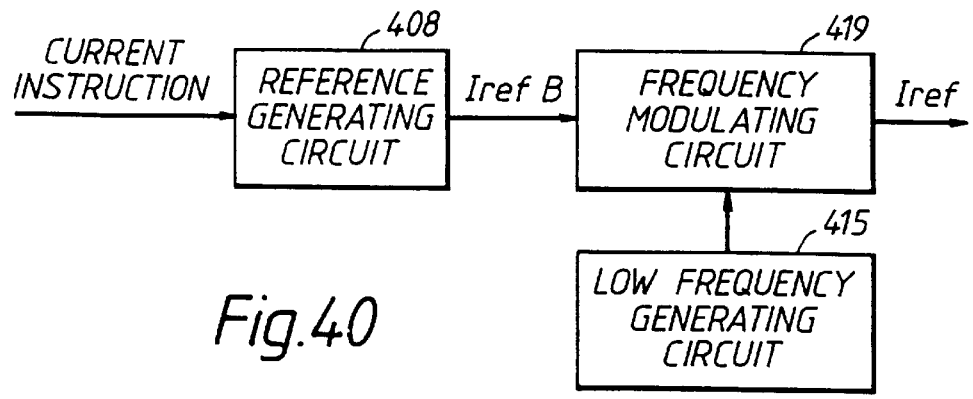
FIG. 40 is a circuit diagram showing the essential parts of a control equipment for a resistance welding machine according to a twentieth embodiment of this invention.
Figure 41A:
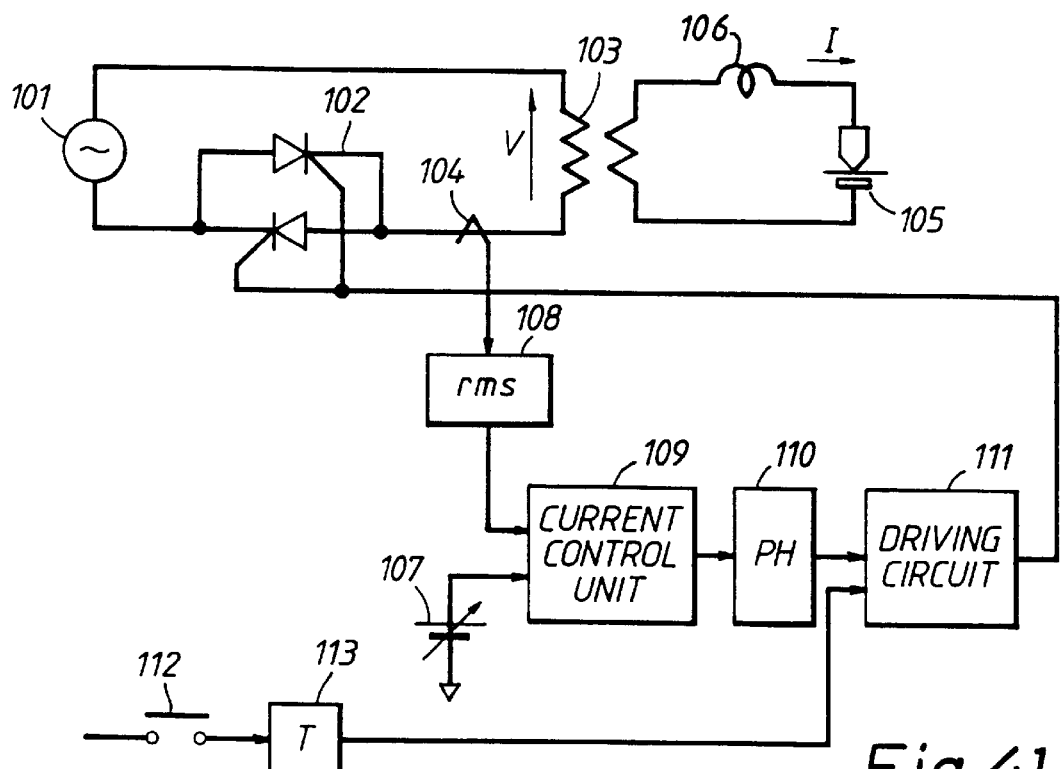
FIGS. 41a and 41b are circuit diagrams showing one example of a prior art control equipment for a resistance welding machine.
Figure 41B:
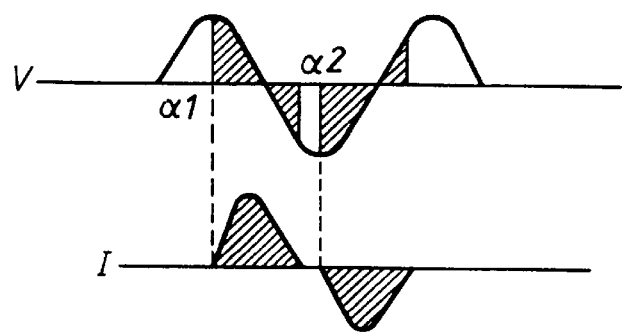
Figure 42A:
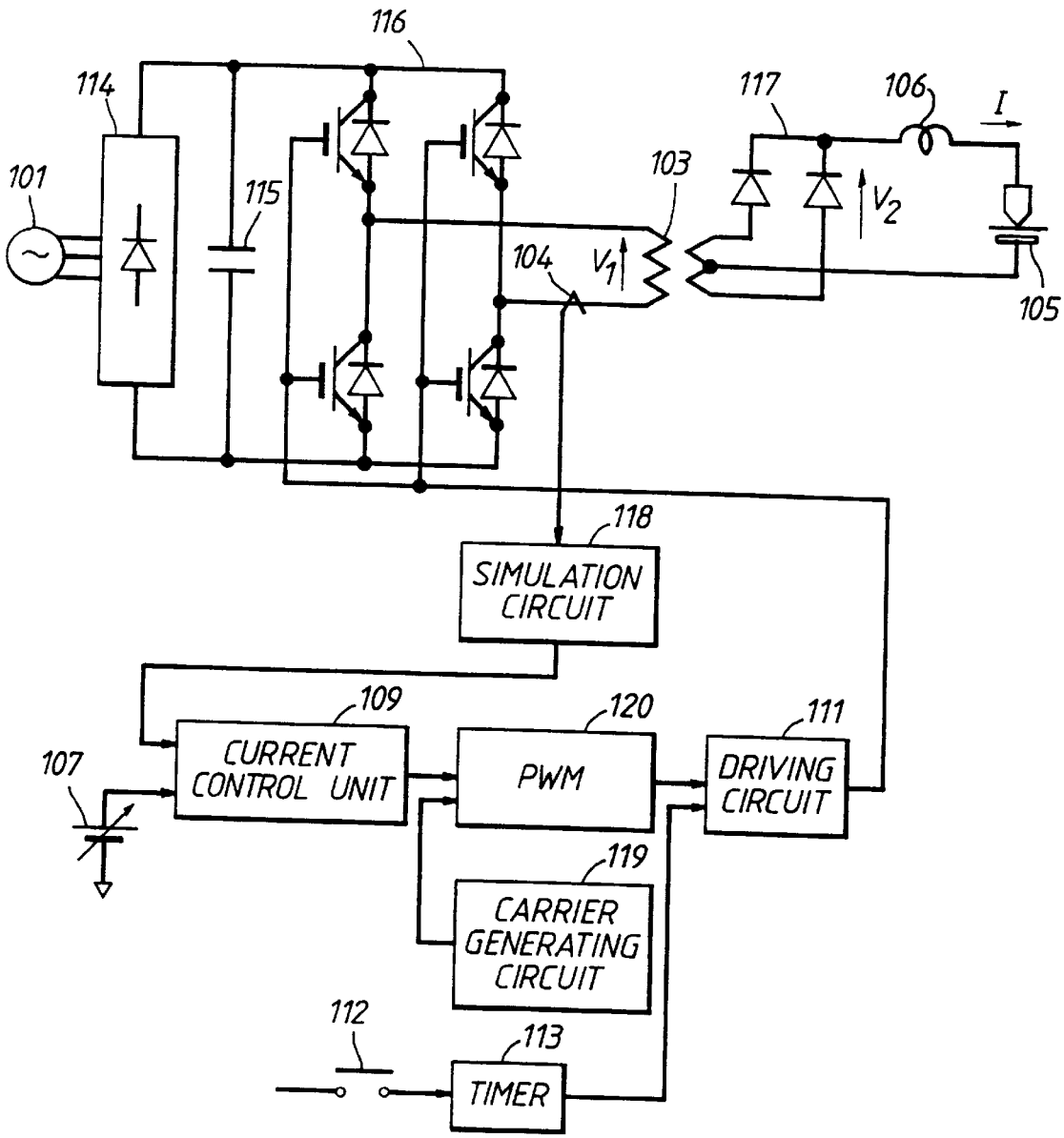
FIGS. 42a, 42b, 42c, and 42d are circuit diagrams showing another example of a prior art control equipment for a resistance welding machine.
Figure 42B:
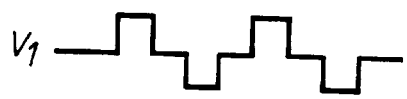
Figure 42C:
Figure 42D:
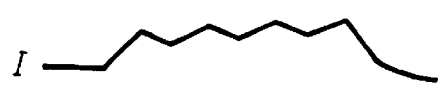

FIG. 40 shows a main part of a control equipment for a welding machine according to a twentieth embodiment of this invention. As against the composition of the embodiment shown in FIG. 34, the control equipment for a welding machine of this embodiment is composed of a low frequency generating circuit 415, and a frequency modulating circuit 419 which executes frequency modulation of current reference IrefB of reference generating circuit 408 by the output of low frequency generating circuit 415 to obtain a current reference Iref, which is applied to comparator amplifier 409 shown in FIG. 34.

With this composition, the basic frequency of the current reference itself is further frequency modulated by a low frequency.

By performing the frequency modulation of this embodiment, the frequency of the audible noise possessed by the trapezoidal wave current waveform itself disperses. By this means, it is changed to white audible noise. Therefore, the audible audible noise is reduced.

When using the thirteenth to twentieth embodiments of this invention as described above, audible noise reduction effects can be obtained compared with a prior art welding machine control equipment.

The thirteenth to twentieth embodiments of this invention can be applied to the control equipments for a resistance welding machine according to the embodiments of this invention as described above, such as shown in FIGS. 6, 14 and 22.

As described above, according to this invention, it is possible to provide a control equipment for a resistance welding machine which can design a long length of life for the welding electrode by preventing polarized wear of the welding electrode.

According to this invention, it is also possible to provide a control equipment for a resistance welding machine which can efficiently perform high quality welding by reducing the electrode wear. Furthermore, a control equipment for a resistance welding machine can be provided which can improve the availability by reducing the down time by reducing electrode wear.

A control equipment for a resistance welding machine can further be provided which can perform high quality welding by improving the current control response characteristics, audible noise resistance characteristics and reducing welding current ripple. A control equipment for a resistance welding machine of this invention can perform high quality welding by compensating the temperature reduction of the welding part when the welding current is inverted. Moreover, according to this invention, a control equipment for a resistance welding machine can be provided which can supple a highly accurate current by compensating the exciting current portion of the transformer. A control equipment for a resistance welding machine can be provided which can improve the utilization of the magnetic flux of the transformer and wherein the control equipment can be made small in size.

It is also made possible to provide a control equipment for a resistance welding machine which can perform high quality welding by controlling to prevent the transformer from saturation and using the magnetic flux density of the core of the transformer to the maximum.

Furthermore, according to this invention, a control equipment for a resistance welding machine can be provided which can reduce audible noises generated due to the modulation frequency and the higher harmonics of the current reference waveform and can improve the working environment of the welding operation.

Obviously, numerous modifications and variations of the present invention are possible in light of the above teachings. It is therefore to be understood that within the scope of the appended claims, the invention may be practiced otherwise than as specifically described herein.

What is claimed is:

1. A control equipment for a resistance welding machine for welding a material by heat generated in said material from applying electric power to said material, comprising:

a converter for converting a DC voltage to an AC voltage by pulse width modulation (PWM) control, said AC voltage and an associated current being applied to said material to apply said electric power;

a current detector configured to detect a current component of the associated current; and PWM control means receiving said current component and PWM controlling said converter at least in part based on said current component, wherein said PWM control means generates a PWM control signal having an ON PWM signal and an OFF PWM signal defining a modulation cycle, said PWM control means including, current reference means responsive to the current component received by the PWM control means for providing a current reference, reference control means for generating a reference control signal based on said current reference received from said current reference means, function generating means receiving said PWM signal and generating a modulation factor based on said received PWM signal, addition means for adding said modulation factor received from said function generating means to said reference control signal received from said reference control means, dither means for generating a dither signal which gradually increases or gradually decreases based on said modulation cycle, compare and adding means for comparing an output from said addition means and said current component from said current detector and for adding said dither signal to one of said output from said addition means and said current component to provide an output and PWM means for generating said PWM signal with said ON PWM signal having a fixed period between occurrences and with said OFF PWM signal having a variable period between occurrences as determined by the output of said compare means.

2. The control equipment for a resistance welding machine according to claim 1, wherein said function generating means includes means for smoothing one of said PWM signal and an inverted signal of said PWM signal through a filter to obtain said modulation factor.

3. The control equipment for a resistance welding machine according to claim 1, further comprising:

adjusting means for adjusting said modulation cycle to perform said pulse width modulation control according to a state of a load of said resistance welding machine;

wherein said converter is pulse width modulation controlled based on said modulation cycle adjusted by said adjusting means.

4. The control equipment for a resistance welding machine according to claim 1, wherein said control equipment further includes a transformer receiving the AC voltage and associated current and coupling them to the material and a conduction period control means for providing a series of conduction periods for the converter to provide the AC voltage and associated current to the transformer, wherein each conduction period has a start conduction time and an end conduction time, said conduction period control means including, detection means for detecting the transformer conduction polarity and conduction time width at a final half-cycle of said associated current just before the conduction period control means ends a first conduction period of said series of conduction periods, conduction control means for comparing whether said conduction time width is wider or narrower than a predetermined time width and for controlling said conduction control means to provide the start conduction time so that the associated current in the transformer will flow in a direction of said conduction polarity when said conduction time is detected to be narrower than said predetermined time and in a direction opposite to said conduction polarity when said conduction time is detected to be wider.

* * * * *